United States Patent
Davis

(10) Patent No.: US 10,706,446 B2
(45) Date of Patent: Jul. 7, 2020

(54) METHOD, SYSTEM, AND COMPUTER-READABLE MEDIUM FOR USING FACIAL RECOGNITION TO ANALYZE IN-STORE ACTIVITY OF A USER

(71) Applicant: Facebook, Inc., Menlo Park, CA (US)

(72) Inventor: Stephen Moore Davis, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 756 days.

(21) Appl. No.: 15/160,910

(22) Filed: May 20, 2016

(65) Prior Publication Data

US 2017/0337602 A1    Nov. 23, 2017

(51) Int. Cl.

| | |
|---|---|
| *G06Q 30/00* | (2012.01) |
| *G06Q 30/06* | (2012.01) |
| *H04L 29/08* | (2006.01) |
| *G06K 9/00* | (2006.01) |
| *H04W 4/029* | (2018.01) |
| *G06Q 10/08* | (2012.01) |

(52) U.S. Cl.
CPC ..... *G06Q 30/0607* (2013.01); *G06K 9/00288* (2013.01); *G06Q 30/0617* (2013.01); *H04L 67/306* (2013.01); *H04W 4/029* (2018.02); *G06Q 10/08* (2013.01)

(58) Field of Classification Search
CPC ....................................... G06Q 30/0601–0645
USPC .............................................. 705/26.1–27.2
See application file for complete search history.

(56) References Cited

U.S. PATENT DOCUMENTS

| | | | | |
|---|---|---|---|---|
| 7,556,192 | B2* | 7/2009 | Wokaty, Jr. | G07D 11/00 235/379 |
| 8,694,401 | B2* | 4/2014 | Stewart | G06Q 40/00 705/35 |
| 9,197,867 | B1* | 11/2015 | Scalisi | H04N 7/186 348/143 |
| 2008/0147511 | A1* | 6/2008 | Edwards | G06Q 20/00 705/18 |
| 2009/0125324 | A1* | 5/2009 | Keravich | 705/2 |

(Continued)

OTHER PUBLICATIONS

Norcie, G., De Cristofaro, E., & Bellotti, V. (2013). Bootstrapping trust in online dating: Social verification of online dating profiles doi:http://dx.doi.org/10.1007/978-3-642-41320-9_10 (Year: 2013).*

*Primary Examiner* — Resha Desai
*Assistant Examiner* — Kennedy Gibson-Wynn
(74) *Attorney, Agent, or Firm* — Keller Jolley Preece

(57) ABSTRACT

One or more embodiments of the disclosure provide systems and methods providing improved customer service to visiting customers of a brick-and-mortar merchant location. For example, a customer recognition system intelligently detects and notifies a merchant when a customer is in need of assistance based on the customer's facial expression. The customer recognition system can also identify a product associated with the customer need. In some examples, the customer recognition system identifies a user profile associated with a customer shopping at a merchant location, determines a trust level for the customer based on user profile information, and based on the trust level, causes a secured product display to provide a customer access to a secured product.

20 Claims, 9 Drawing Sheets

(56) References Cited

U.S. PATENT DOCUMENTS

2014/0019241 A1* 1/2014 Treiser ............... G06Q 30/0609
                                                                705/14.53
2015/0142595 A1* 5/2015 Acuña-Rohter ... G06Q 20/4014
2016/0321633 A1* 11/2016 Chandrasekaran .... G06Q 20/20
2017/0171195 A1* 6/2017 Chang ................ H04L 63/0861

* cited by examiner

METHOD, SYSTEM, AND COMPUTER-READABLE MEDIUM FOR USING FACIAL RECOGNITION TO ANALYZE IN-STORE ACTIVITY OF A USER

BACKGROUND

People often visit brick-and-mortar retail establishments on a daily basis, and often multiple times a day. Brick-and-mortar merchants, such as retail stores, grocery stores, department stores, malls, strip malls, etc., provide people (e.g., customers) with the ability to purchase a variety of products (e.g., goods and services). Even with the growth of e-commerce and the ability to purchase products online, consumers continue to purchase a significant amount of products from brick-and-mortar merchants.

Brick-and-mortar retail locations offer the ability for a merchant to interact with consumers face-to-face. For example, brick-and-mortar merchants often employ associates to make a sales pitch to consumers, answer consumer questions, or otherwise assist consumers within the brick-and-mortar location (e.g., locate a product, perform an inventory check, look up the price of an item, etc.). However, many conventional brick-and-mortar merchants struggle to efficiently provide a proper level of consumer support. For example, associates working at conventional brick-and-mortar merchants often spend significant amounts of time wandering the floor of a brick-and-mortar location without finding a consumer that needs assistance. In addition to the inefficient use of time for the associate, often times the associate causes the unintended effect of frustrating consumers by intruding or interfering with consumers that are not wanting assistance. Thus, conventional brick-and-mortar associate assistance models are often inefficient from a time and expense of associate employees, and furthermore, often cause a negative consumer impression.

From the perspective of a consumer, conventional brick-and-mortar merchants fail to provide assistance or support in the moment that the consumer wants the assistance (e.g., when the consumer has a question). For example, with conventional brick-and-mortar merchants, a consumer experience often involves the consumer not being able to locate any associates, resulting in the consumer resorting to physically searching the retail location to find an associate. Having to search for an associate generally frustrates consumers and leads to a negative consumer experience, or in some cases, the consumer may simply decide to leave without making a purchase they would have otherwise made if the consumer would have been able to speak to an associate.

Moreover, with conventional brick-and-mortar merchants, when a consumer is seeking a sales associate for assistance, the consumer often leaves the proximity of the product. As a result of leaving the proximity of the product, the likelihood of the consumer buying the product significantly decreases. In other cases, although the consumer may find an associate, the consumer may discover the associate is busy or otherwise engaged and cannot help. Furthermore, upon finding an associate, the consumer often learns that the particular associate is not knowledgeable in the relevant product area. Overall, the effort required for the consumer to obtain assistance within a conventional brick-and-mortar merchant is often inefficient and frustrating. In turn, the inability for conventional brick-and-mortar merchants to provide efficient and timely consumer support frequently results in a loss of sales for the merchant and increased dissatisfaction of consumers.

In addition to the challenge of providing efficient and timely assistance to consumers, another problem area that conventional brick-and-mortar merchants face is providing access to secured products (e.g., products protected within a locked display case, stored behind counters, or otherwise inaccessible to a consumer). Examples of secured products include items ranging from expensive products to popular items that are frequently stolen. With conventional brick-and-mortar merchants, consumers that want to purchase a secured product need the assistance of an associate to provide the consumer access to the secured product. Unfortunately, and as discussed above, conventional brick-and-mortar merchants often are not able to provide timely assistance when a consumer needs access to secured products. Accordingly, conventional brick-and-mortar merchants in essence create a large purchase barrier for consumers with respect to secured products, which results in a loss of sales for the merchant, and decreased consumer satisfaction.

Accordingly, these and other disadvantages exist with respect to conventional brick-and-mortar merchants.

SUMMARY

Embodiments of the present disclosure provide benefits and/or solve one or more of the foregoing or other problems in the art with systems and methods for providing efficient and timely customer service to customers visiting a brick-and-mortar merchant location. In particular, the systems and methods detect and identify a customer within a brick-and-mortar location, analyze information associated with the customer, and based on the analysis determine one or more actions to related to providing customer support or assistance to the customer. Thus, the systems and methods described systematically and intelligently identify a customer's needs, and communicates those needs in various ways to provide efficient and timely customer assistance to a customer within a brick-and-mortar merchant location.

In accordance with one or more embodiments, the systems and methods disclosed herein can intelligently detect and notify a merchant when a customer is in need of assistance. For example, the systems and methods can capture and analyze an image of a customer that is located within a brick-and-mortar merchant location to determine and/or predict a customer need. For instance, example embodiments of the systems and methods can analyze an image to predict a customer's need based on customer characteristics within the image (e.g., facial expressions, body language). Upon detecting or predicting a customer need, the systems and methods can take one or more actions to meet the customer need.

One or more example embodiments described herein include systems and methods to grant a customer access to a secured product (e.g., a product within a locked display case). For example, systems and methods can determine an identity of a customer located within a brick-and-mortar merchant location, and based on identifying the customer, analyze information associated with the identified customer to determine whether the identified customer should be trusted with access to a secured product. Based on determining a customer is trustworthy, the systems and methods enable the customer to access the secured product in a timely manner. For example, in one or more embodiments, the systems and methods allow the customer to open the locked display case without the need of assistance from an employee.

Additional features and advantages will be set forth in the description which follows, and in part will be obvious from the description, or may be learned by the practice of such exemplary embodiments.

BRIEF DESCRIPTION OF THE DRAWINGS

In order to describe the manner in which the above recited and other advantages and features of one or more embodiments can be obtained, a more particular description will be rendered by reference to specific embodiments thereof that are illustrated in the accompanying drawings. It should be noted that the figures are not drawn to scale, and that elements of similar structure or function are generally represented by like reference numerals for illustrative purposes throughout the figures. These drawings depict only typical embodiments, and are not therefore considered to be limiting of its scope. Accordingly, various embodiments will be described and explained with additional specificity and detail using the accompanying drawings.

DETAILED DESCRIPTION

Figure 1:
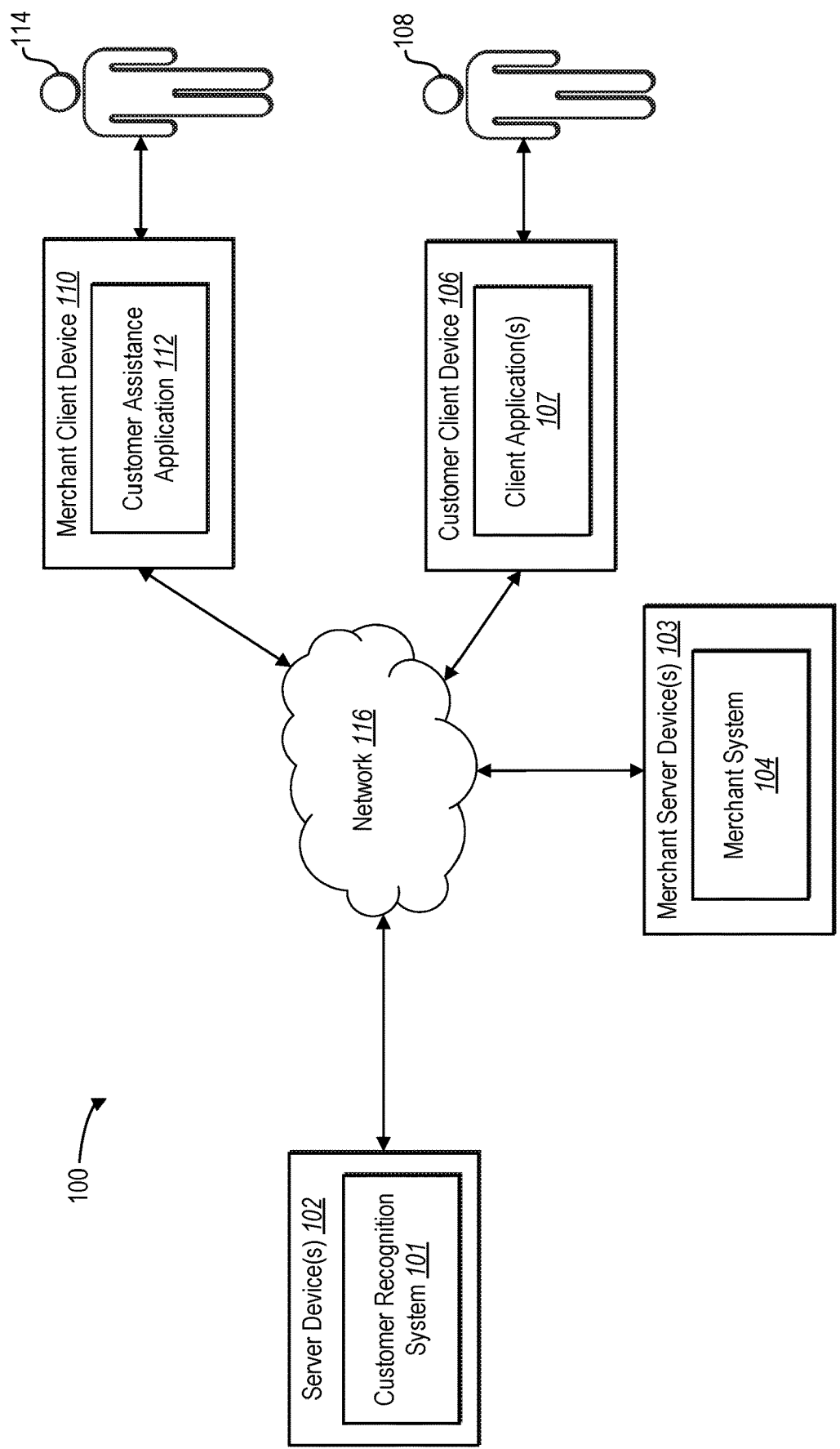
FIG. 1 illustrates an example embodiment of a communication environment in accordance with one or more embodiments described herein.

The embodiments disclosed herein describe a customer recognition system that quickly and efficiently provides targeted and situational specific customer service to customers visiting a brick-and-mortar location. For example, the customer recognition system disclosed herein may predict or otherwise determine that the customer is in need of assistance with a specific product or product type. For instance, the customer recognition system can receive and analyze an image of a customer visiting a brick-and-mortar merchant location to determine the customer needs assistance, and in addition, determine a product or type of product with which the customer needs assistance. Furthermore, the customer recognition system can use one or more images of a customer to determine an identity for a customer, access and analyze information specific to the identified customer to provide personalized customer service to the customer. In one or more embodiments, the customer recognition system analyzes information associated with an identified customer to determine a trust level of the customer, and based on the trust level, the customer recognition system can allow the identified customer to access a secured product (e.g., a product in a locked display case).

Accordingly, the customer recognition system quickly provides directed and situational specific customer assistance to customers visiting a brick-and-mortar merchant location, which leads to increased customer satisfaction and, in turn, an increased number of product purchases. Further, from a merchant's perspective, the customer recognition system increases the efficiency of in-store customer service by either providing the customer assistance in an automated manner (e.g., without the use of an employee) or by notifying and directing employees to specific customers in the moment the customer is determined to need assistance. Moreover, and as discussed further below, the customer recognition system uses automated systems to directly provide a customer with assistance without the use of employees.

According to one or more disclosed embodiments, the customer recognition system receives an image or image feed from a camera located within a brick-and-mortar location. For example, the image or image feed includes an image of a customer standing next to a particular product or group of products. In one or more embodiments, the customer recognition system can analyze the face of the customer portrayed in the image. For instance, the customer recognition system can detect one or more facial characteristics to determine a facial expression type for the customer portrayed in the image or image feed. Based on determining a facial expression type, the customer recognition system can infer or determine that the customer needs assistance (e.g., upon determining a confused facial recognition type, the customer recognition system can determine the customer has a question).

In addition, the customer recognition system can analyze an image, or metadata associated with the image, to determine a product in which the customer is showing interest. For example, the customer recognition system can determine a location of a customer within the brick-and-mortar location and identify a product corresponding to that location, or the customer recognition system can simply identify a product portrayed within the image based on a product recognition analysis. Therefore, in addition to determining that a customer needs assistance, as mentioned above, the customer recognition system further determines a product associated with the customer need.

The customer recognition system performs one or more actions based on determining that a customer needs assistance and/or determining a product associated with the customer need. For example, upon determining a customer need, the customer recognition system identifies one or more available employees currently working at the merchant location where the customer is located. Moreover, in one or more embodiments, the customer recognition system can identify a particular employee having specific training or knowledge about the product the associated with the customer need. In any event, based on identifying one or more available employees capable of addressing the determined customer need, the customer recognition system sends a customer service notification to the one or more merchant employees to direct the merchant employees to assist the particular customer (e.g., the customer service notification is sent to a mobile device of each of the one or more employees).

Depending on a particular embodiment, the customer service notification includes various types of information. For example, the customer service notification can include the customer location, the determined customer need (e.g., product question or disgruntled customer), product information regarding an identified product, an image of the customer, and/or information about the customer (e.g., frequency or number of times the customer has shopped with the merchant, purchase history, promotions that may be relevant to the customer). Based on the information included within the customer service notification, a merchant employee can quickly locate the customer and use information within the customer service notification to efficiently provide assistance to the customer in the moment of the customer's need.

In one or more embodiments, rather than notifying a merchant employee, or in addition to notifying a merchant employee, the customer recognition system can interact directly with the customer. For example, based on determining an identity of a customer, the customer recognition system can further identify a mobile client device (e.g., smart phone) associated with the identified customer. Accordingly, the customer recognition system can send an electronic communication directly to the customer's mobile client device to directly provide assistance to the customer without the need of a merchant employee. In this manner, the customer recognition system can confirm the product in which the customer is investigating and/or provide production information directly to the customer via the customer's mobile client device. In some embodiments, the customer recognition system can establish a communication session (e.g., IM, text, phone call, video chat) between the customer and a merchant employee.

One way in which the customer recognition system can directly assist a customer is by providing a customer with access to a secured product. For example, many merchants keep various types of products in a locked display case based on the value of the product or the frequency of shoplifting instances associated with a product. In one or more embodiments, the customer recognition system can identify a customer and determine a trust level for the identified customer by analyzing information associated with the identified customer. For instance, in one or more embodiments, the customer recognition system can analyze information associated with a customer profile maintained within a social networking system. Based on determining an acceptable trust level for a customer, the customer recognition system can remotely provide the customer access to the secured display case.

The customer recognition system provides several advantages over conventional brick-and-mortar customer service models. In particular, the customer recognition system identifies and accurately determines when a customer is needing assistance, and accordingly, is able to provide customer service in the moment of customer need. In addition, the customer recognition system can locate and notify merchant employees best suited to assist a customer with a specific issue or with a specific product in a quick and efficient manner. Moreover, the customer recognition system can provide direct customer service to a customer within a brick-and-mortar location, thus increasing the response time to respond to a customer need. These and other advantages will be discussed in more detail with respect to the figures.

FIG. 1 illustrates an example embodiment of a communication environment 100 that can be used with one or more example embodiments of a customer recognition system. As shown, the communication environment 100 includes one or more server device(s) 102 that includes a customer recognition system 101. The communication environment 100 also includes one or more merchant server device(s) 103 that host a merchant system 104. Further, the communication environment 100 includes a customer client device 106 having one or more client application(s) 107. For instance, the customer client device 106 is associated with a customer 108.

Additionally, and as shown in FIG. 1, the communication environment 100 further includes a merchant client device 110 having a customer assistance application 112. For instance, the merchant client device 110 is associated with a merchant employee 114. Although FIG. 1 illustrates a communication environment 100 that includes a single customer 108 and a single merchant employee 114, it should be understood that FIG. 1 is for explanation purposes and that in one or more additional embodiments the communication environment includes multiple customers each associated with a customer client device and multiple merchant employees each associated with a merchant client device. Moreover, in one or more embodiments, the communication environment 100 can include fewer components as shown in FIG. 1.

As illustrated in FIG. 1, the server device(s) 102 and customer recognition system 101, the merchant server device(s) 103 and merchant system 104, the customer client device 106 and client application(s) 107, and merchant client device 110 and customer assistance application 112 communicate with each other via the network 116. Although FIG. 1 illustrates a particular arrangement of the various components within the communication environment 100, various additional arrangements are possible. For example, the customer recognition system 101 may directly communicate with the merchant system 104, bypassing the network 116. Additional detail regarding the various computing devices and networks are explained below with reference to FIG. 7.

As briefly mentioned above, and as shown in FIG. 1, the server device(s) 102 can include the customer recognition system 101. The customer recognition system 101 provides an improved customer service system to customers visiting a brick-and-mortar merchant location. In general, the customer recognition system 101 predicts or otherwise identifies customers needing assistance, determines and analyzes information corresponding to the identified customer and the customer need, notifies merchant employees of the customer need, and provides the merchant employees with customer service information to aid in resolving the customer need. Additionally, the customer recognition system 101 can communicate directly with a customer (e.g., via the customer client device 106) to provide customers with assistance upon detecting that a particular customer needs assistance. Additional details of the customer recognition system 101 will be described further below with respect to FIGS. 2-6.

In one or more embodiments, the customer recognition system 101 can be implemented as part of, or operate in cooperation with, a social networking system. For example, in one or more embodiments, the customer recognition system 101 accesses, uses, and analyzes information stored within a social networking system to provide one or more features described herein. For example, the customer recognition system 101 can access social networking information, or a social networking system can provide customer recognition system 101 with social networking information, such as, for example, user profile information (e.g., customer profile data), concept profile data, product information, social graph information, and/or other data within a social networking system. Additional detail regarding social networking systems is provided below with reference to FIGS. 8-9.

Returning to the figures, FIG. 1 illustrates that customer recognition system 101 can communicate with the merchant system 104. The merchant system 104 can be associated across multiple locations of the same merchant, or alternatively, a single merchant location. In general, the merchant system 104 can track inventory, sales, product orders, etc., in connection with a retail location or several retail locations. In one or more embodiments, the merchant system can communicate with system 101 (or with a social networking system) to provide merchant information, product information, and/or customer information. For example, customer recognition system 101 can create and maintain a profile associated with the merchant that includes information provided, directly or indirectly, by the merchant. The merchant profile on the server device 102 may include information regarding products, product brands, and product categories provided by the merchant (e.g., within the merchant's physical retail location). Further, when a customer provides authorization, such as subscribes to a loyalty program with the merchant and/or otherwise grants permission, the merchant profile can include customer information (purchase history, product preferences, etc.).

In one or more embodiments, the merchant system 104 can include various in-store components to collect in-store customer information to allow customer recognition system 101 to determine or detect when a customer needs assistance. For example, the merchant system can include one or more digital cameras that provide an image or image feed to customer recognition system 101 for processing and analysis, as described further below. In addition, the merchant system can include a variety of beacons or signal producing components to assist in identifying a location of a customer within a merchant location. For example, the merchant system 104 can include one or more Wi-Fi networks. Additionally, the merchant system 104 can include BLUETOOTH beacons that can be used, in combination with a customer client device or merchant client device to determine a location of a customer or merchant employee within a merchant location.

In addition, and as briefly mentioned above, the merchant system 104 can include a secured product display. For example, a secured product display is an in-store display case that prevents a user of freely accessing a product located within the secured product display. For instance, a secured product display can include an access point (e.g., a hinged or sliding door) that can be locked or unlocked to selectively provide access to secured products within the secured product display. In some embodiments, the merchant system 104 can include one or more secured product display cases that are communicatively coupled to the merchant system 104 and/or customer recognition system 101. As such, customer recognition system 101 or the merchant system 104 can communicate over a wired or wireless direct or network connection to instruct the secured product display to provide access to a customer. Additional details about the secured product display are found below.

As used herein, the term "merchant" may refer to any provider of goods and/or services. In some example embodiments, a merchant may be affiliated with a social networking system (e.g., the merchant may advertise or sell one or more products by way of the social networking system). Alternatively, the merchant may be a third-party merchant that is separate from and independent of a social networking system. Examples of merchants include, but are not limited to, merchants providing a specific category of product, merchants providing a broad variety of products, merchants having physical as well as virtual stores, and merchants having only physical stores. The terms "merchant location," "retail location," and "store," as used herein, refers to a physical, "brick-and-mortar" location where a merchant offers goods and/or services for sale to customers.

As used herein, the term "product" may refer to any good (tangible or intangible) or service. Further, the terms "product" and "products" can refer to a single product, type of product, or product category. The term "product category" may refer to any grouping, type, class, division, subdivision, set, kind, genre, or classification of products. The terms "product brand" or "brand" may refer to a name, design, symbol, or any other feature that identifies the manufacturer or origin of a product.

The terms "customer preference," "product preference," and "customer profile information" may interchangeably refer to any interest, preference, or proclivity a customer has for a product, product brand, and/or product category. In general, a customer profile may reflect an expectation of customer action with respect to a particular product (e.g., an expectation that the customer will purchase the product). In one or more embodiments, customer profiles include or are based on information regarding past purchases, interests, recommendations, ratings, reviews, comments, survey results, statistics, and/or social networking activity (e.g., check-ins, likes). Customer profile information can be derived from any suitable source of information. For example, in some embodiments, customer profiles incorporate information, or are based on information a social networking system obtains, information the merchant system 104 obtains and provides, information obtained from one or more third-parties (e.g., third-party e-commerce websites), and/or information obtained from a customer client device(s) (e.g., directly provided by a user, or obtained from cookies, tracking pixels, and/or any other tracking/logging software that records a customer's product browsing, geolocation history, and/or purchasing history).

In one or more embodiments, the collection and use of customer profile information is subject to user preferences and privacy policies to which the customer agrees. For example, the customer may specify which profile information the social networking system is allowed to track, the length of time the social networking system is allowed to save profile information, and/or how the social networking uses the profile information. For instance, a customer can set user preference settings to completely opt-out the profile information features so that the social networking system does not track, collect, or store profile information with respect to the opted-out consumer. In addition, at any point in time, a customer can clear or reset stored profile information.

Figure 2:
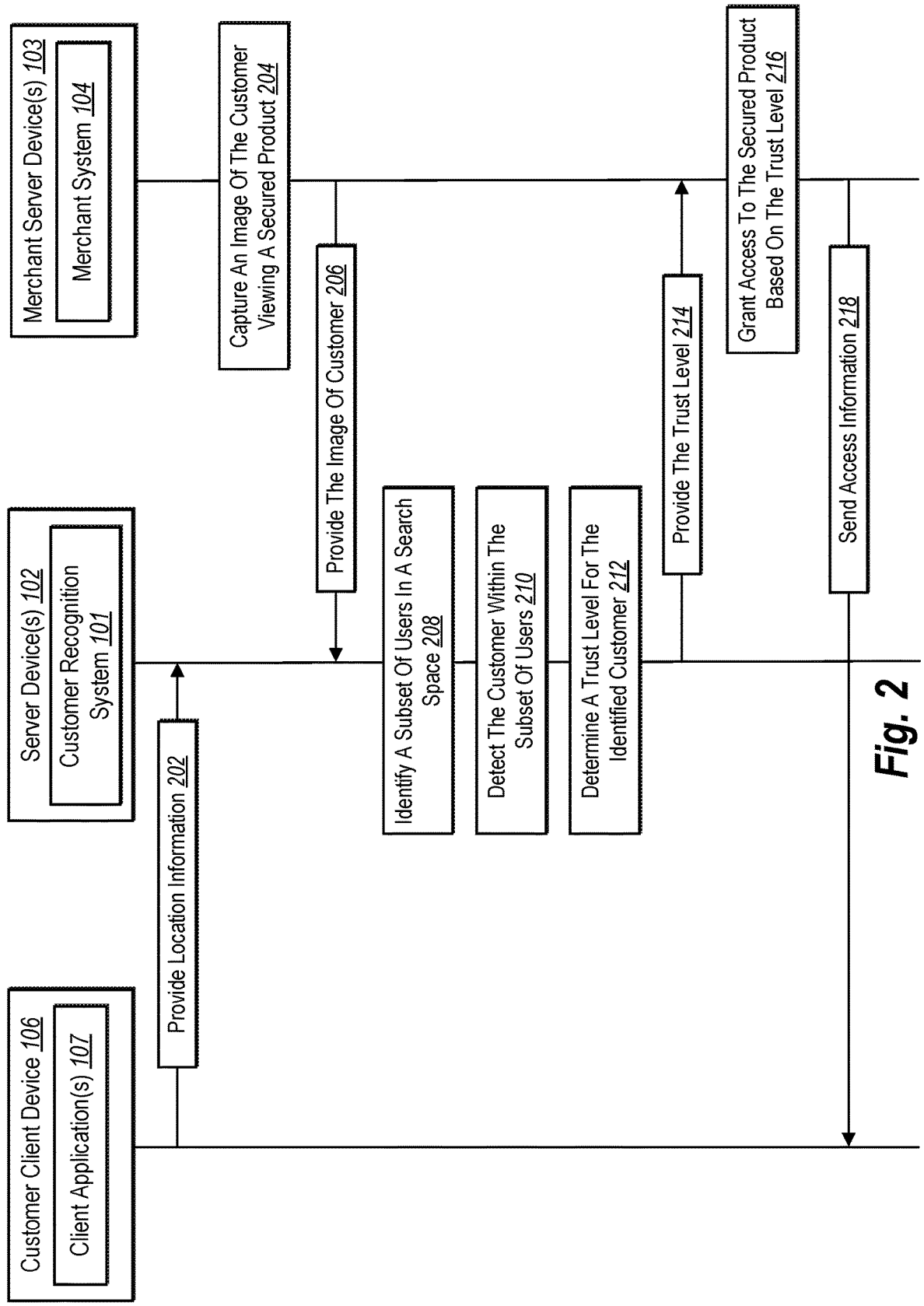
FIG. 2 illustrates a sequence-flow diagram of the customer recognition system providing a customer trust level in accordance with one or more embodiments described herein.

FIG. 2 illustrates an example embodiment of a sequence-flow diagram showing a process for determining a trust level for a customer, and taking one or more actions based on the determined trust level. Specifically, FIG. 2 illustrates an example embodiment of a process for providing a customer access to a secured product at a merchant location based on identifying a customer, accessing information associated with the customer, and determining whether the particular identified customer can be trusted to access the secured product (e.g., the customer presents a low theft risk). As shown, FIG. 2 includes the customer recognition system 101, the merchant system 104, and the client application(s) 107. For example, the customer recognition system 101, the merchant system 104, and the client application(s) 107 can be the same or similar to those described with respect to FIG. 1.

In one or more embodiments, and as illustrated in FIG. 2, the client application 107 on the client device associated with a customer can send location information 202 to customer recognition system 101. For example, in one or more embodiments, the client application 107 can be an application associated with the customer recognition system 101, or in the event that the customer recognition system is part of a social networking system, the client application 107 can be an application associated with the social networking system. The client application can access GPS or other location information determined on the client device and send the location information to the customer recognition system 101 to allow the customer recognition system 101 to use the customer location, as will be described further below.

As further shown in FIG. 2, the merchant system 104 can capture an image of the customer viewing a secured product 204. For example, the merchant system 104 can include a networked digital camera proximate to or within a secured product display that captures an image of a customer when a customer is positioned in a location to view a secured product within the secured product display. In some embodiments, the merchant system 104 captures an image of the customer in response to the customer selecting an option, such as a pressing an access request button or providing a verbal command to access the product. The captured image can be a video feed or a digital photo, in any event, however, the captured image portrays the customer.

In step 206, the merchant system 104 provides the image of the customer 206 to the customer recognition system 101. For example, the merchant system 104 electronically transmits the image to the customer recognition system 101. To protect the identity of customers, the merchant system 104 can encrypt images of the customers when transmitting images to the customer recognition system 101. Alternatively, rather than sending an image, the merchant system 104 can analyze the image to determine image feature vectors, and send the feature vector data to the merchant system 104.

Upon receiving the image portraying a customer, the customer recognition system 101 proceeds to perform one or more processes to identify the customer within the customer recognition system 101 (e.g., identify a customer profile associated with the customer). In general, the customer recognition system 101 matches the face of the customer portrayed in the image with an image of a face associated with a user identify or user profile. Accordingly, the customer recognition system 101 searches a search space (e.g., a user profile database) that includes images portraying faces associated with user profiles. For instance, a search space can include millions of user profiles, with some users being associated with multiple images of their face. For example, the search space can be made up of users from one or more social networking systems, as well as from other user profile databases.

While the customer recognition system 101 can perform facial recognition searches on an entire search space, depending on the number of user profiles within a search space, and thus the number of images the customer recognition system 101 has to analyze may become restrictive from a computing capacity or time allowance. As such, and as illustrated in FIG. 2, in one or more embodiments the customer recognition system 101 identifies a subset of user profiles from a search space of user profiles 208. Identifying a subset of user profiles constrains the search space to a reduced number of user profiles, and thus reduces the number of images the customer recognition system 101 must analyze to identify the customer portrayed in the image. Accordingly, the customer recognition system 101 can more quickly identify the customer and reduce the time the customer waits before being authorized to access the secured product.

The customer recognition system 101 can constrain the search space to determine the subset of user profiles based on one or more factors. For example, in one or more embodiments, the customer recognition system 101 can determine which users to include and exclude in the subset of users based on location data received from customer client devices associated with customers. For example, and as described above, the client application operating on various customer client devices can provide location information associated with various customers to the customer recognition system 101.

Moreover, the image of the customer received form the merchant system 104 can include or be associated with information (e.g., metadata) to identify a particular merchant location. Accordingly, the customer recognition system 101 can create a subset of user profiles based on identifying customers located within a defined geographic distance (e.g., 100 yards, 500 yards, one mile, five miles) from the particular merchant location associated with the image portraying the customer. In one or more embodiments, and based on the accuracy of the location information, identifying the subset of user profiles includes determining customers actually present at the merchant location.

Accordingly, and as described above with respect to step 202, because client application 107 provides location information that indicates the customer is at or near the merchant location, the customer recognition system 101 can include the user profile of the customer within the subset of user profiles, in addition to other user profiles corresponding to customers that are also located at or near the merchant location.

In addition to using location information associated with a client device of a customer, the customer recognition system 101 can constrain the search space based on customers who reside (e.g., live and/or work) within a geographic boundary of the merchant location. For instance, in one or more embodiments, the customer recognition system 101 limits the search space to user profiles that indicate a user resides within one or more cities or zip codes proximate to the merchant location. Likewise, the customer recognition system 101 can limit the search space to users residing within a geographical radius (e.g., 5 miles) or within a travel-time threshold (e.g., less than a 20-minute drive) of the merchant location.

Additionally, and/or alternatively, the customer recognition system 101 can limit the search space to customers that visit the retail location. For example, user profile information can indicate that a user has visited and/or made a purchase at the merchant location within a defined time period. Further, the customer recognition system 101 can identify user profiles that indicate customers viewed the merchant's online website or social networking page. For instance, if a user looks up an item online for a particular retail location or indicates a particular store as their preferred store, the customer recognition system 101 can add the user to the search space for that retail location.

In some embodiments, the customer recognition system 101 includes users that frequent nearby locations and/or users associated with a competitor's store. For instance, if the customer recognition system 101 assists multiple merchants, the customer recognition system 101 can combine the customers from the multiple merchants into a single constrained search space. For example, if a customer frequently shops at a grocery store, the customer recognition system 101 adds the customer to the search space for other merchants located in the same shopping complex. In another example, if a customer regularly visits a hardware store (physically or the merchant's online presence) for one merchant, the customer recognition system 101 can add the customer to the search space for a competing merchant's hardware store located nearby.

In some embodiments, the customer recognition system 101 dynamically changes the size of the user profile subset. For example, in some embodiments the customer recognition system 101 first identifies the subset of user profiles based on location data associated with customers. If the customer recognition system 101 cannot identify the customer from this constrained search space, the customer recognition system 101 expands the search space to include customers that have previously purchased products from a merchant's retail location. The customer recognition system 101 can continue to expand the constrained search space until the customer is identified.

Alternatively, the customer recognition system 101 can dynamically limit or reduce the search space until a threshold number of user profiles are included that allow for timely image analysis to identify the customer. For example, the customer recognition system 101 can user a first factor to identify a subset of users (e.g., a zip code of the merchant location). If the number of user profiles in the subset is greater than the threshold number, then the customer recognition system 101 can further limit the search space using a second factor (e.g., user profiles indicating a preference for the merchant). The customer recognition system 101 can continue with the dynamically limiting process until the number of user profiles within the identified subset of users is reaches the threshold number of users.

Further, in various embodiments, the customer recognition system 101 can prioritize user profiles in a constrained search space for a merchant location. For example, the customer recognition system 101 can give each user profile a score that indicates the likelihood that the customer associated with the user profile shops at the merchant location, or that indicates the customer's connection strength to the retail location. The score can be based on the factors described above for which a user profile can be added to a subset of user profiles. The customer recognition system 101 can also weigh each factor independently based how strong the factor indicates a connection to the particular retail location. Then, when identifying the customer from the constrained search space, the customer recognition system 101 can start with the highest scored users first and continue to lower ranked users, which provides a greater likelihood that the customer will be quickly identified.

Returning to FIG. 2, step 210 illustrates that the customer recognition system 101 detects or otherwise identifies the customer 108 within from within the subset of users profiles. For example, the customer recognition system 101 matches the face of the customer portrayed in the image to an image associated with a user profile. Upon finding a matching face, the customer recognition system 101 accesses the customer's user profile information link to the matching face.

In some embodiments, the customer recognition system 101 can use machine learning and/or a neural network to identify a match. For example, the customer recognition system 101 employs a neural network (using feature vector matching or other techniques) to determine whether the face of the customer within the image provided by the merchant matches (e.g., above a threshold confidence level) an image of a face associated with a user profile. The customer recognition system 101 can also use other facial recognition techniques and algorithms (e.g., principal component analysis, multi-linear subspace learning, neuronal motivated dynamic link matching, using Eigen faces, linear discriminate analysis, elastic bunch graph matching) to identify a match.

In step 212, the customer recognition system 101 determines a trust level for the identified customer 108. In general, upon identifying the user profile associated with the customer, the customer recognition system 101 can determine a trust level for the customer 108 based on the associated user profile information. The customer recognition system 101 or the merchant system 104 can then use the trust level to determine whether to grant the customer access to the secured product within the secured product display.

Depending on the embodiment, trust levels can be binary or multi-level. For example, in some embodiments, the customer recognition system 101 determines that a customer is either trustworthy or not trustworthy. In other embodiments, the customer recognition system 101 can assign trust levels corresponding to a sliding scale. Examples of trust level scales include low, medium, high; trusted for products within a certain price range; trusted for categories of products; trust based on age of customer (e.g., under 18, under 21, over 21); and/or any combination of trust scales. Accordingly, a trust level may provide a customer access to certain categories of secured products (e.g., razors), but not to other categories of secured products (e.g., electronics). The trust level may be universal to all merchants, or alternatively, a trust level can be based on particular merchant characteristics.

The customer recognition system 101 can determine a level of trust for the customer based on a number of factors. For example, the customer recognition system 101 can access user profile information associated with the customer, including personal information, such as age, location of residence, employment type and status, family status, recent life events, etc. For instance, the customer recognition system 101 can use one or more types of user profile data in a formula that calculates a trust level. To illustrate, the formula can apply various weights to the one or more types of user profile data to obtain the trust level. An example of a trust level assessment formula is shown below:

$$\text{Trust Level} = w_1 x_1 + w_2 x_2 + w_3 x_3 + \ldots + w_n x_n$$

where $x_i$ is a data value of a piece of user profile information (e.g., $x_1$ corresponds to the customer's age, $x_2$ corresponds to the customers gender, $x_3$ corresponds to the customer's location, ..., and $x_n$ corresponds to an nth criterion), and $w_i$ is a weight applied to each of the corresponding data values.

The weight for each data value can vary depending on various factors. For instance, the weight assigned to each data value can be customized for a particular merchant based on what data values are most significant to determining the trust level of a customer for the particular merchant. In addition, the weight for each data value can depend on the specific type of secured product being accessed by the customer. For example, the customer recognition system 101 can use a first trust level formula to determine a trust level for a first secured product type (e.g., personal hygiene products) and a second trust level formula for a second secured product type (e.g., medicine). Each of the trust level formulas can use one or more of the same criteria and/or different criteria, as well as one or more of the same weights and/or different weights applied to the same or different criteria.

The customer recognition system 101 can receive data from the merchant system 104 to refine a trust level model to more accurately predict a trust level of a customer. For example, the customer recognition system 101 may identify that a large percentage of trustworthy users have a similar first characteristic, while a large percentage of non-trustworthy users have a similar second characteristic. Upon identifying user characteristics that indicate a particular degree of trust, the customer recognition system 101 can modify the formula(s) based on the learned characteristics to improve the likelihood of correctly identifying a user as trustworthy or non-trustworthy.

In some embodiments, the customer recognition system 101 determines a trust level based on social networking activity data. For example, the customer recognition system 101 can analyze a customer's social networking activity to identify user behavior that indicates trust. The social networking information can also include the number of followers or "friends" of the customer, characteristics of "friends" of customer, characteristics of followers of the customer, the types of characteristics of user groups, and other social networking information that may indicate a level of trust or confidence in a customer.

In one or more embodiments, the customer recognition system 101 determines a trust level based on, at least in part, prior transactions of a customer. For example, the customer recognition system 101 analyzes prior transactions to determine if the customer has previously purchased the secured product (or similar products). A prior purchase, or a pattern or regular purchases can serve as an indicator of trustworthiness, particularly for a regular purchased secured product. In accessing the prior transaction, the customer recognition system 101 can access prior transactions from the merchant location, as well as transactions from other locations (including online) from the same merchant. In addition, the customer recognition system 101 can access previous customer transactions from other merchants, such as other online transactions and transactions from other merchants.

Similarly, the customer recognition system 101 can base the trust level determination based on a customer's financial information, when authorized by the customer (e.g., the customer agrees to allow the customer recognition system 101 to access portions of his or her financial information). Financial information can include financial/credit history, income, debt, or employment status. For instance, if the secured product is expensive (e.g., high-end jewelry or watches), the customer recognition system 101 can determine if the customer can reasonable afford the product and/or has a history purchasing expensive items. Additionally, the customer recognition system 101 can determine a trust level based on whether the user is of a certain age (an appropriate age for the product) or of legally age to obtain a secured product.

The customer recognition system 101 may determine that a customer is not trustworthy when the customer recognition system 101 cannot identify the customer or has insufficient information for the customer. For example, the customer recognition system 101 may determine that a customer with no information other than a social networking login (e.g., no name, location data, age, address, etc.) does not have sufficient information to determine an accurate trust level. In such an instance, the customer recognition system 101 can communicate a denial to the merchant system that causes the merchant system 104 to indicate to the customer (e.g., via the secured product display) that the customer is not granted access to the secured products. For example, the merchant system 104 can cause the secured product display to flash a red light, to produce an audio indication or message, or simply alert the customer that a merchant employee is needed for the customer to obtain the secured product.

In one or more embodiments, if the customer recognition system 101 cannot identify the customer or determines that the customer has an insufficient trust level, the customer recognition system also sends a notification to the merchant system 104 or to a merchant client device 110 of a merchant employee indicating that the customer requires assistance at the particular secured product display. The notification can include the image of the customer and the location of the secured customer display to allow the merchant employee to quickly and efficiently provide assistance to the customer.

Once the customer recognition system 101 determines a customer's trust level, the customer recognition system 101 can associate that trust level with the customer. In this manner, upon subsequently identifying the customer, the customer recognition system 101 can look up the customers trust level whether the customer is trusted. However, a trust level for a customer can change as the customer recognition system 101 receives additional and/or updated user information. Therefore, if a customer who previously was not trusted to access a secured product establishes a pattern of purchasing the product (by having an employee access the product while not trusted), the customer recognition system 101 can update the customer's trust level to indicate trustworthiness.

Likewise, if a customer that is granted access to a secure product is later found to have shoplifted, the trust level associated with the customer drops. In one or more embodiments, the customer recognition system 101 can determine if a user shoplifted a secured product after being granted access by associating a unique product ID for the product the user retrieved from the secure product display, and reconciling that unique product ID with checkout information from the merchant system 104. If the merchant system 104 does not have a record of selling the product with the unique product ID, then the customer recognition system 101 can infer that the customer stole the product.

In one or more embodiments, and as shown in step 214, the customer recognition system 101 provides the determined trust level for the customer to the merchant system 104, and the merchant system 104 determines whether or not to grant the customer access to the secured product. Alternatively, and as described above, the customer recognition system 101 determines whether or not to grant access to the customer based on the trust level, and accordingly, the customer recognition system 101 sends an electronic communication that either grants access to the customer or denies access to the customer.

Based on the trust level or other electronic communication received from the customer recognition system 101, the merchant system 104 can provide the customer access to the secured product. As shown in step 216, the merchant system 104 provides access to the secured product based on the trust level. The merchant system 104 can provide the customer access in a variety of ways. For example, the merchant system 104 can automatically unlock the secured product display. Further, the merchant system 104 can illuminate a light or indicate via a display associated with the secured product display that the display is unlocked and the customer is granted access. As another example, the merchant system 104 can automatically dispense the secured product such that the customer can obtain the security product.

In some embodiments, and as indicated in step 218 of FIG. 2, the merchant system 104 (or alternatively the customer recognition system 101) sends access information to the client application 107 on the customer client device 106. For example, the merchant system 104 can provide an access code to a customer via the client device. For example, as part of detecting a customer's identity, the customer recognition system 101 can identify a client device associated with the customer. Further, in some cases, the customer recognition system 101 can verify that the client device is located at or near the merchant location. The customer recognition system 101 can send an authorization code to the client device and a matching authorization code to the secured product display. Accordingly, the customer can enter the authorization code into the secured product display, the secured product display can verify the authorization code against the code it received, and upon verification, the secured product display can unlock to provide the customer access to the secured product.

In one or more embodiments the authorization code may be a numeric combination that a customer manually enters using a keypad on the secured product display. In alternative embodiments, the authorization code can be a code that the client application 107 can communicate to the secured product display. For example, the access information can cause client application 107 on the client device 106 to communicate a code or specific signal via NFC, WI-FI, or Bluetooth that causes the secured product display to provide access to the customer. Further, in connection with receiving access information, the customer's client device may provide the customer a notification that he or she is authorized to access to secured product. The notification may also include instructions on how the customer can access the security product without assistance from an employee.

While FIG. 2 shows interactions between the customer recognition system 101 and the merchant system 104, in some embodiments steps 204 through 216 may be performed using other computing device configurations. For instance, the secured product display can include a computing device that includes a camera (e.g., a smartphone or tablet). The computing device may perform the above steps to identify the customer, determine a trust level, and remotely grant or deny access to a secured product. Further, the computing device can communicate with the customer recognition system 101 to access updated user profile information and/or methods for determining a customer's trust level.

Identifying a customer using one or more of the above processes and methods, the customer recognition system 101 can provide additional benefits to the merchant and customer. For example, upon matching a customer to user profile information, the customer recognition system 101 can provide advertisements tailored personally to the customer. For instance, using facial recognition to identify a customer, the customer recognition system 101 and/or the merchant system 104 can push an advertisement to the customer's client device (or a display such as a LCD monitor facing the customer) providing an advertisement for the secured product or nearby products. To illustrate, the customer recognition system 101 identifies a customer, who is in front of facial razors, and determines that the customer is trusted. In addition, to granting the customer access to the razors, the customer recognition system 101 can also provide a coupon to the customer's client device for the razors.

Figure 3:
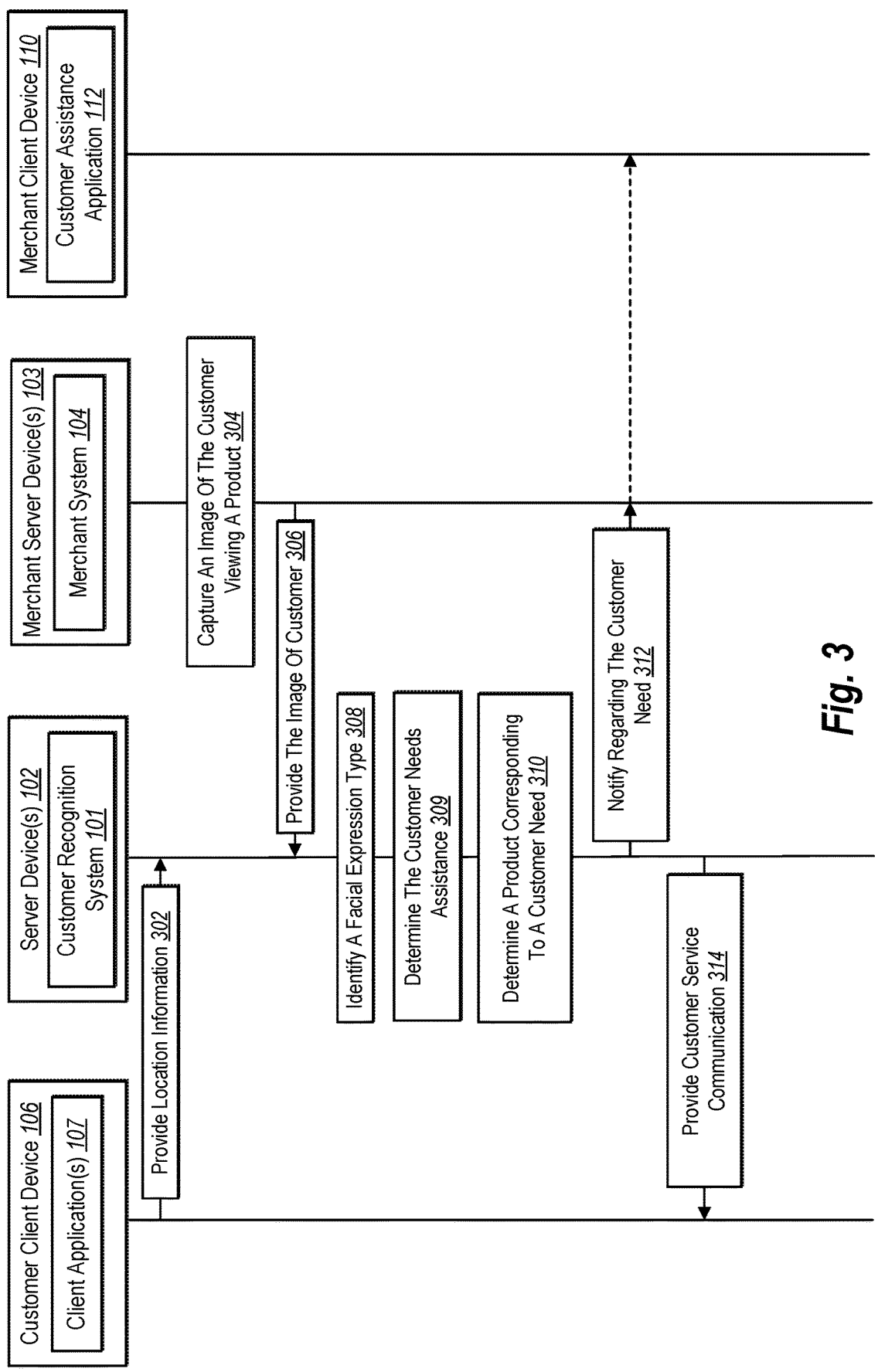
FIG. 3 illustrates a sequence-flow diagram of the customer recognition system providing a notification with respect to a customer need in accordance with one or more embodiments described herein.

In addition to providing a customer access to a secured product, FIG. 3 illustrates a sequence-flow diagram showing the customer recognition system 101 providing a notification to the merchant system 104 regarding a customer in need of assistance. As described in detail below, FIG. 3 provides examples of how the customer recognition system 101 can monitor a customer, predict or detect when a customer needs assistance, determine the type of assistance the customer needs, and notify the most suitable merchant employee (e.g., based on proximity the customer and/or based on employee expertise) to resolve the detected customer need.

As shown, the sequence-flow diagram illustrated in FIG. 3 involves the customer recognition system 101, the merchant system 104, the client application(s) 107 on the customer client device 106, and the customer assistance application 112 on the merchant client device 110. For example, the customer recognition system 101, the merchant system 104, the client application(s) 107 on the customer client device 106, and the customer assistance application 112 on the merchant client device 110 can be the same or similar to those described with respect to FIG. 1.

As shown FIG. 3, step 302 includes the client application 107 providing the customer recognition system 101 with location information as described above with reference to FIG. 2. In addition, the merchant 104 captures an image (or multiple images) of the customer, as indicated in step 304. The merchant system 104 may use an image capturing device at various positions within the merchant location to capture images of the customer. As shown in step 306, the merchant system 104 provides the image (or multiple images) of the customer to the customer recognition system 101, as described above with respect to FIG. 2. In one or more embodiments, the merchant system 104 detects the presence of a user within an image prior to sending the image to the customer recognition system. The merchant system can detect the presence of a user based on detecting a movement within a camera feed, or by analyzing an image to detect the presence of a person.

As shown in step 308, the customer recognition system 101 analyzes the image portraying the customer to determine a facial expression type expressed by the customer within the image. A facial expression type is a defined type facial expression within a group of facial expression and where each facial expression type is associated with a particular customer emotion or customer need. In general, the customer recognition system 101 can identify facial expression features (or other customer characteristics such as body language) of the customer portrayed in the received image and compare the identified facial expression features of the customer to image groups corresponding to different facial expression types. For example, the customer recognition system 101 can compare the customer image with a first group of images that represent a confused facial expression type, a second group of images that represent an angry facial expression type, a third group of images that represent a happy facial expression type, and/or one or more additional groups of images that represent one or more additional facial expression types.

Based on the comparison of the customer image with each group of images, the customer recognition system 101 can determine the group of images to which the facial expression of the customer most closely correspond. In some embodiments, the customer recognition system 101 uses machine learning where each group of images is a training set of images that allow a neural network to match the facial expression features of the customer to a group of images associated with a facial expression type. One will appreciate that the customer recognition system 101 may use alternative methods for determining a customer's expression from one or more captured images.

In one or more embodiments, the customer recognition system 101 can analyze a sequence of images portraying the customer where the merchant system 104 captures the sequence of images within a defined time period (e.g., three seconds to ten seconds). For instance, by analyzing a sequence of images captured over a time period the customer recognition system 101 can avoid inaccurately determining a facial expression type based on a customer's random facial expression in a single image. Accordingly, the customer recognition system 101 can determine if a threshold percentage or number of images within the sequence of images correspond to a facial expression type prior to finalizing a determination of facial expression type for the customer.

Base on identifying a facial expression type for the customer, the customer recognition system 101 can determine the customer needs assistance, as indicated in step 309 of FIG. 3. For example, and as briefly mentioned above, each facial expression type can be associated with a particular customer need. For instance, a confused facial expression type can be associated with a customer need to receive an answer to a question, such as locating a product or learning additional information about a product. An angry facial expression type can be associated with a customer need of receiving customer service based on a poor customer experience. A happy facial expression type may not be associated with any particular customer need, but rather, can simply inform the merchant system 104 of an apparently satisfied customer for data analysis and metric reporting.

In addition to the identified facial expression type, the customer recognition system 101 can use additional information to further define a customer need. For example, and as illustrated in step 310 of FIG. 3, the customer recognition system 101 determines a product that may correspond to the customer need. For instance, the customer recognition system 101 can identify a product within the image received from the merchant system. Or, alternatively, the merchant system 104 can include product identification information along with the same communication that includes the image(s) that portray the customer. For instance, a particular camera within the merchant system 104 can be directed at a specific product or group of products, and thus the customer recognition system 101 includes product identification information for the specific products found the view of the camera along with the images. The customer recognition system 101 uses the product identification information to then determine or more clearly define the customer need.

Based on identifying that the customer needs assistance and/or further defining the nature of the customer need, the customer recognition system 101 notifies the merchant system 104 of the customer need, as indicated in step 312 of FIG. 3. In one or more embodiments, the customer recognition system 101 sends a notification to the merchant system 104. The merchant system 104 uses information within the notification to identify one or more merchant employees capable of addressing the customer need. For example, the merchant system 104 can identify a merchant employee based on the location of a merchant employee with respect the customer (e.g., based on the location of a merchant client device associated with a merchant employee). For instance, the merchant system 104 can prioritize merchant employees within the closest proximity to the customer.

Furthermore, the merchant system 104 communicates with the customer assistance application to determine an availability of a merchant employee. For example, the customer assistance application 112 corresponding to a particular merchant employee communicates with the merchant system 104 to provide a real-time availability of the employee to respond to a customer need. In one or more embodiments, a merchant employee interacts with the customer assistance application to indicate the merchant employee's status (e.g., helping a customer, on break, or available). The merchant employee status can be automatically updated based on the merchant employees work schedule, or based on the merchant employee accepting or being assigned to a previous customer need (e.g., the customer assistance application sends a "helping a customer" status until the merchant employee clears the assigned customer notification).

Additionally, the merchant system 104 can identify a merchant employee based on matching a merchant employee's expertise to the customer need defined within the customer need notification. In some embodiments, for example, the merchant system 104 includes a database of employee profiles that indicate particular employee attributes corresponding with particular customer needs. Examples of employee attributes can include product training or product expertise, demeanor characteristics to deal with particular customer emotions typically associated with a customer need (e.g., is the employee identified as good problem solver and clear communicator), or management/authority level to adequately address a defined customer need.

Accordingly, the merchant system 104 can analyze the employee database to identify the best available employee to address the customer need. In one or more embodiments, for instance, the merchant system 104 can use a combination of a variety of merchant employee characteristics (as discussed above) to rank the merchant employees. In response to ranking the merchant employees for a particular customer need, the merchant system 104 sends a notification of the customer need to the highest ranked merchant employee.

The merchant system 104 can weight or favor particular merchant employee attributes. For example, for a particular customer need the most important consideration is to have a merchant employee locate the customer in the shortest amount of time. As such, the location of the merchant employee relative to the customer is weighted to represent the significance of time with respect to the particular customer need. Alternatively, merchant knowledge of a complicated product can be the most important attribute with respect to another particular customer need, and accordingly, the product expertise associated with merchant employees is weighted to represent the significance of product knowledge.

Moreover, depending on a particular customer need, the merchant system 101 can notify more than one merchant employee. For instance, the merchant system 101 can combine two or more employees to obtain the desired merchant employee attributes in aggregate using the two employees. Or, alternatively, an emergency customer need (e.g., when the facial expression type of the user is associate with a panic or concerned expression) can cause the merchant system 104 to notify the three closest merchant employees relative to the customer. An extreme emergency customer need situation may notify all merchant employees located within the merchant location.

As an alternative to the sequence-flow shown in FIG. 3, the customer recognition system 101 can perform the merchant employee analysis and identify the best suited merchant employee(s) to handle the customer need. For example, instead of notifying the merchant system 104 of the customer need, the customer recognition system can directly notify one or more merchant employees via customer assistance applications on the merchant client devices. Thus, the dashed line illustrated in FIG. 3 represents that the customer recognition system 101 or the merchant system 104 can communicate with merchant client devices to notify identified merchant employees best suited to address the customer need.

The notification of the customer need can include various type of information to assist merchant employees to quickly and efficiently address the customer need. For example, in some cases the notification provides a location of the customer (e.g., a particular aisle or a particular department within the merchant location). In one or more embodiments, the customer assistance application can indicate on a map of the merchant location the position of the customer within the merchant location as well as the position of the merchant employee. Moreover, the location of both the customer and the merchant employee can update in real-time so that as the merchant employee moves closer to the customer, the merchant movement is indicated to the merchant employee via the customer assistance application. In one or more embodiments, the customer recognition system 101 can also provide an image of a customer to the merchant systems 104. The image may be the captured image of the customer. As such, an employee is able to quickly identify the customer needing assistance.

In some embodiments, the notification can also include information regarding an identified product or product category. For instance, upon determining a product associated with a customer need, the customer recognition system 101 can locate product information within a merchant database that includes information for each product the merchant offers for sale. Alternatively, the customer recognition system 101 can perform an Internet search using the product name or product ID to locate a URL link or web page that includes additional information about the determined product. The product information is provided to the customer assistance application on the merchant's client device, which in turn the merchant employee can access to help assist the customer.

Further, based on the determined customer need, the customer recognition system 101 can prompt or provide via the customer assistance application 112 suggested language or a suggested question for the merchant employee to speak to the customer. For example, the suggested language can include information about a promotion associated with a product, or can include answers to the most frequently asked questions about the product. Moreover, if the customer need is associated with an angry customer, the suggested language can include language designed to calm a customer and identify the customers concern.

In general, the customer recognition system 101 can detect a customer's confusion without the need to specifically determine the identity of the customer. If, however, the customer recognition system 101 can identify the customer, for example using facial recognition as described above with reference to FIG. 2, the customer recognition system 101 can provide a number of additional benefits to the merchant and the customer. To illustrate, upon determining the identity of a customer, the customer recognition system 101 can analyze user profile information associated with the customer and provide customer information to the merchant system 104 and/or customer assistance application 112 of a merchant employee. For instance, relevant customer information can include a customer's preferred brand or product preference.

In another instance, the customer recognition system 101 can inform a merchant that a customer has been researching products online similar to the product associated with the customer need. Using this information, the employee can educate the confused customer regarding the similarities and differences between the merchant's product and the online product.

In some embodiments, rather than, or in addition to, notifying the merchant system 104, the customer recognition system 101 can provide direct assistance to the customer. For example, and as illustrated in step 314 of FIG. 3, the customer recognition system 101 can provide a customer service communication directly to the client device associated with the customer. Upon identifying the customer, the customer recognition system 101 can push notifications or product information to the customer's client device (e.g., via text message or via the client application 107). In some embodiments, the customer recognition system 101 establishes a digital communication session, for instance, text messaging, instant messaging, an audio call, VoIP call, video chat, or other digital communication. For example, the customer may have a quick product inventory question that can be answered via text message and that does not require a face-to-face meeting.

In one or more embodiments, the customer recognition system 101 can push notifications directly to a customer to help the customer find a product. For instance, if a customer is standing in front of the cold medicine display with a confused look, the customer recognition system 101, can access user profile information to determine that the customer prefers a particular brand of cold medicine, and in response, notify the customer via the client device 106 of the location of the particular brand of cold medicine.

In another embodiment, if the products in a merchant location have recently moved display locations, the customer recognition system 101 and prompt the customer to determine if the customer is looking for the recently moved product. Based on the customer response, the customer recognition system 101 can provide the new location of the product. Further, in some embodiments, the customer recognition system 101 can provide a coupon to the customer to make up for the inconvenience.

In addition, using facial recognition, the customer recognition system 101 can perform advertisement analytics with customers. For example, each time the merchant system 104 sends an image of a customer viewing a product to determine if the customer requires assistance, the customer recognition system 101 can perform facial recognition on the image. Upon recognizing the customer, the customer recognition system 101 can associate the customer with the product that the customer is viewing. Further, the customer recognition system 101 can record which products a customer viewed in a table. Using products from the table, the customer recognition system 101 can determine which product advertisements to send to the customer. Likewise, if the customer recognition system 101 sends an advertisement for a particular product, the customer recognition system 101 can later determine the advertisement's effectiveness based on whether the customer viewed the product.

Significantly, in one or more embodiments the consumer recognition system 101 has access to customer profile information that extends across various merchants. Thus, the the consumer recognition system 101 can use cross merchant profile information to accurately predict a customer need due to having access to profile information that profiles a consumer in a more complete and accurate way compared to if the customer profile data only included a single merchant or a single merchant location.

Figure 4:
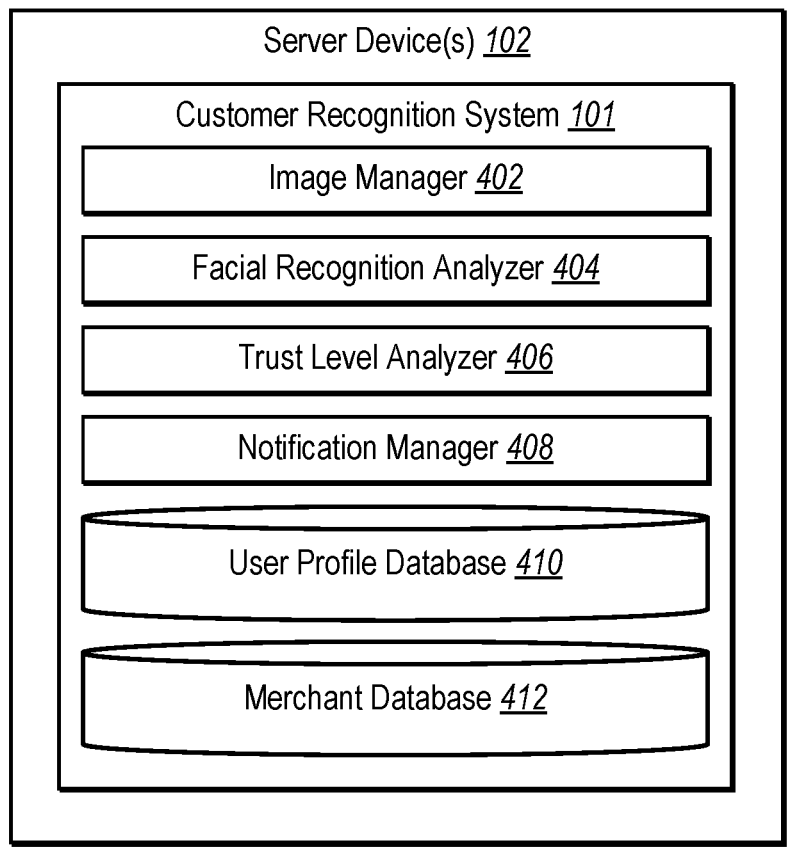
FIG. 4 illustrates a schematic diagram of a customer recognition system in accordance with one or more embodiments described herein.

FIG. 4 illustrates a schematic diagram of a customer recognition system 101 operating on server device(s) 102. For purposes of explanation, the customer recognition system 101 in FIG. 4 can represent one or more embodiments of the customer recognition system 101 discussed above with respect to FIGS. 1-3. As illustrated in FIG. 4, the customer recognition system 101 includes an image manager 402, a facial recognition analyzer 404, a trust level analyzer 406, and a notification manager 408. In addition, the customer recognition system 101 also includes a user profile database 410 and a merchant database 412.

Each component of the customer recognition system 101 may be implemented using a computing device including at least one processor executing instructions that cause the customer recognition system 101 to perform processes described herein. The components of the customer recognition system 101 can be implemented by a single server device, or across multiple server devices. Although a particular number of components are shown in FIG. 4, the customer recognition system 101 can include more components or can combine the components into fewer components (such as a single component), as may be desirable for a particular implementation.

As briefly mentioned above, and as illustrated in FIG. 4, the customer recognition system 101 includes an image manager 402. In general, the image manager 402 receives and organizes images received from merchant systems. For example, when a merchant system sends the customer recognition system 101 an image, the image manager 402 receives the image and metadata about the image. For example, the metadata can include the merchant location that sent the image, the location of the image within the merchant location, which products are associated with the image, and/or whether the image is part of a set of images).

The image manager 402 can also determine the reason for the merchant providing the image. For example, the image manager 402 may receive an image with instructions to identify the customer in the image and provide a trust level, as described above. When the customer recognition system 101 is to perform image recognition, the image manager 402 can determine an appropriate subset of users (e.g., a constrained search space) as detailed above. Additionally, and/or alternatively, the image manager 402 may receive an image with instructions to determine whether the customer requires assistance, as also described above.

In addition, and as described in greater detail above, the facial recognition analyzer 404 analyzes images to determine an identity of a customer portrayed in an image or to determine a customer need associated with a facial expression of the customer. For example, the facial recognition analyzer 404 can compare a face from the received image to a constrained search space to match the customer to a user profile. In addition, the recognition analyzer 404 can also identify a facial expression type indicated by the face of the customer portrayed in the image.

The trust level analyzer 406 determines a trust level for an identified customer. For instance, the trust level analyzer 406 determines, for an identified customer, a trust level based on the customer's user profile, history, connections, habits, and/or social networking activity. The trust level analyzer 406 can use a weighted formula or other methods, as described above, to determine a trust level. As further described above, a determined trust level can result in causing a secured product display to provide a trusted customer access to a secured product.

The notification manager 408, in general, provides notifications to a merchant system, a merchant client device associated with a merchant employee, and/or a customer client device associated with a customer. For example, as described above, the notification manager 408 can notify a merchant employee via a customer assistance application on a merchant client device of a customer need, where the customer is located, and a product associated with the customer need. In addition, the notification manger can communicate with a client application on a customer client device to present customer service communications directly to the customer. Further, the notification manager 408 can provide advertisement opportunities to the customer with respect to one or more products. These and other functions of the notification manager 408 are detailed above.

The user profile database 410 includes user profile information as described herein. For example, the user profile database 410 can store user profile information as described herein. In addition, the components 402-408 of the customer recognition system 101 can use information in the user profile database 410 to identify a customer, customer preferences, and/or product preferences. Further, the user database 410 can include social networking information, as described below in connection with the social networking system described below.

The merchant database 412 can include merchant and transaction data. For instance, the merchant database 412 includes product data, transaction data, theft data, customer data, etc. In addition, the merchant database 412 includes data that enables the customer recognition system 101 to provide trusted customers access to secured products, provide suggestions regarding products to merchants and/or customers, and provide customer data to the customer recognition system 101, as described above.

Figure 5:
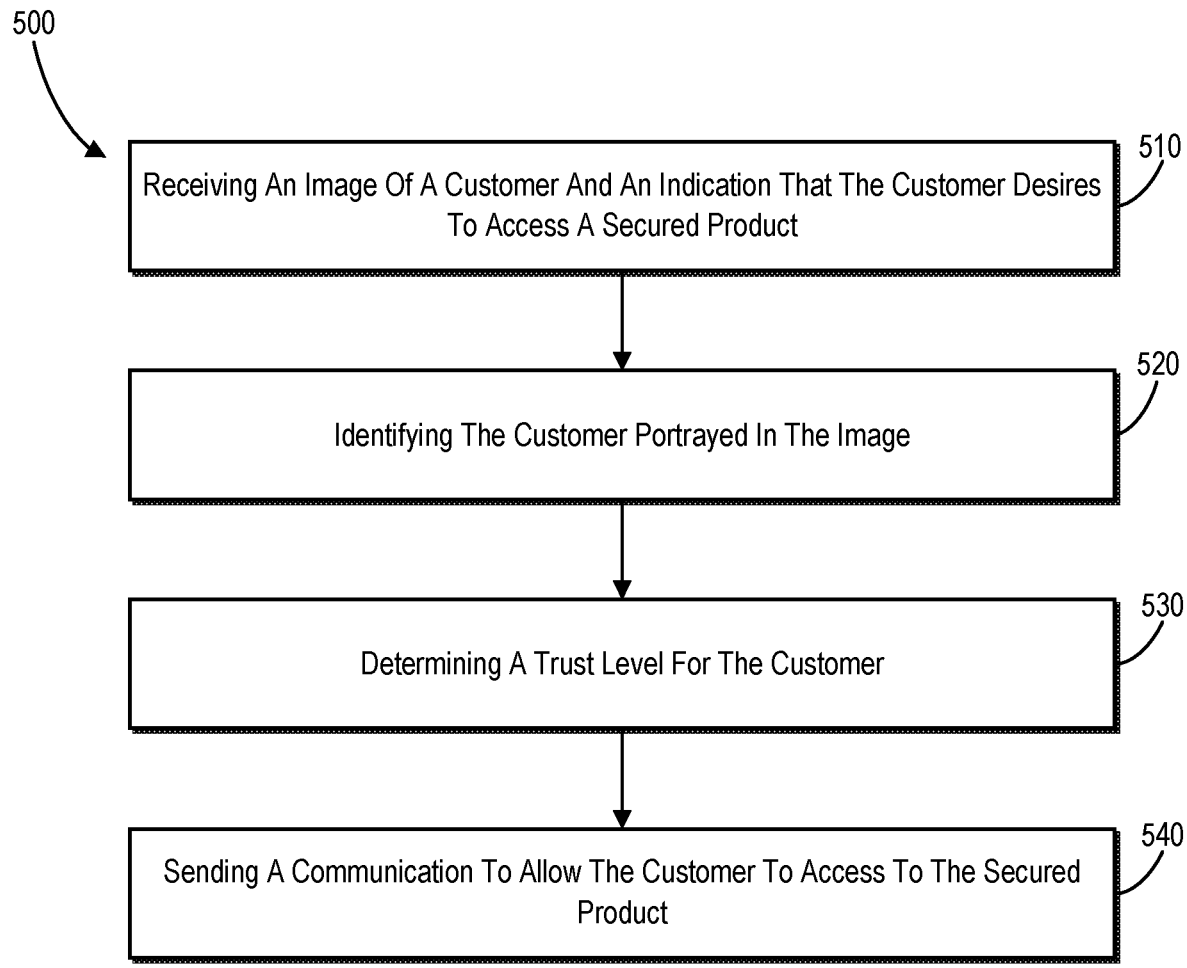
FIG. 5 illustrates a flowchart of a method of providing a customer trust level in accordance with one or more embodiments described herein.
Figure 6:
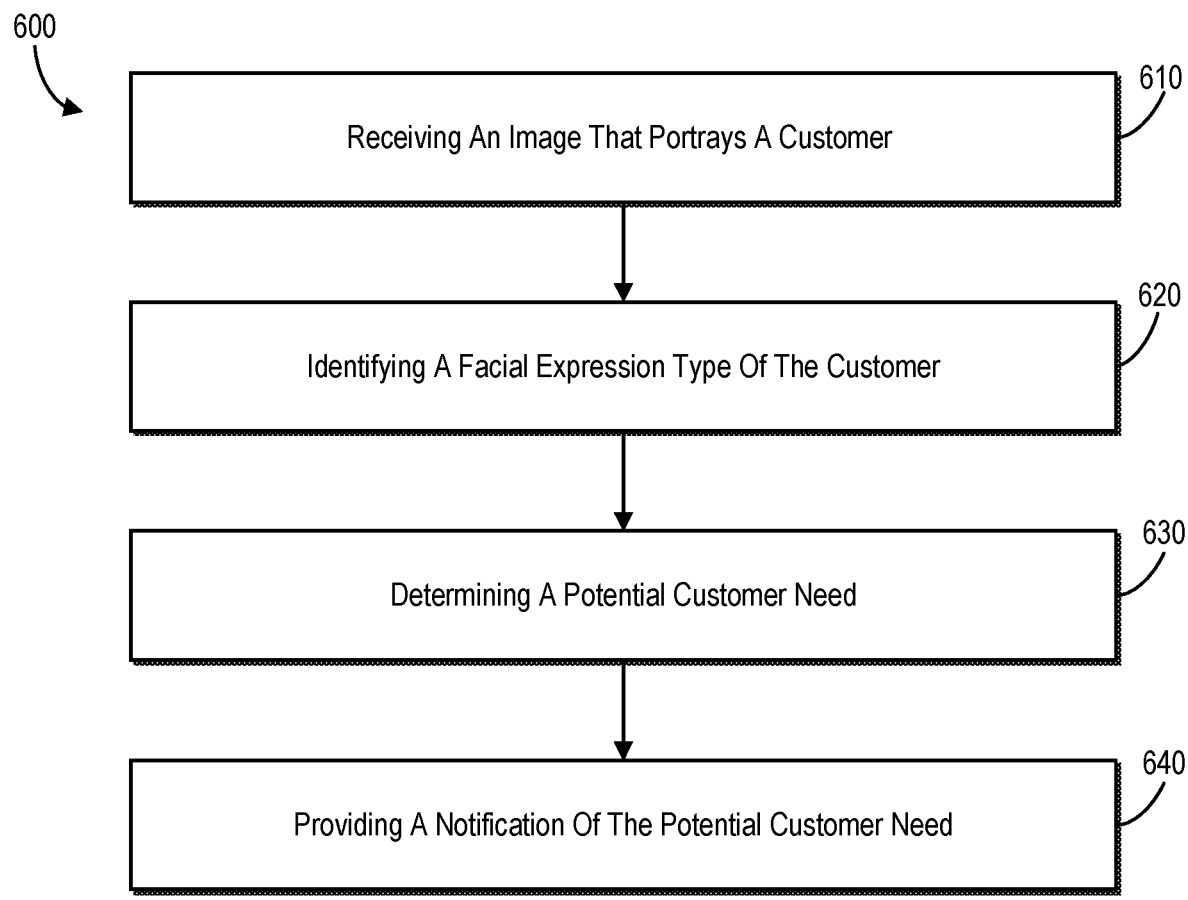
FIG. 6 illustrates a flowchart of a method of providing a notification with respect to a customer need in accordance with one or more embodiments described herein.

In addition to the foregoing, embodiments of the present invention also can be described in terms of flowcharts comprising acts and steps in a method for accomplishing a particular result. For example, FIG. 5 illustrates a flowchart of an exemplary method for providing a customer access to a secured product. FIG. 6 illustrates a flowchart of an exemplary method for detecting a customer need.

As mentioned, FIG. 5 illustrates a flowchart of a method 500 of for providing a customer access to a secured product. The method 500 includes an act 510 of receiving an image of a customer and an indication that the customer desires to access a secured product. In particular, the act 510 can involve receiving, from the merchant, an image that portrays a customer and an indication that the customer desires to access a secured product within a secured product display at a physical location of the merchant. For example, the image may be captured in connection with a secured product display that the user is desires to access, and the indication of the customer's desire to access a secured product can be included in the metadata of the image based on the image being captured in connection with the secured product display.

The method 500 also includes an act 520 identifying the customer portrayed in the image. In particular, the act 520 may involve analyzing, by at least one processor, the image to identify the customer portrayed in the image. For example, the act 520 can involve performing facial recognition on the subset of users associated with the merchant to match the face of the user to a stored face within the subset. In one or more embodiments, act 520 can include identifying a subset of users within an initial search space. In one or more embodiments, constraining the search space of users includes selecting users most likely to be at the physical location of the merchant. In addition, the act 520 may also include the acts of determining that a mobile client device associated with the user is located in or proximate to the physical location of the merchant and in response to the determination, and adding the user to the subset of users associated with the merchant.

Further, the method 500 includes in act 530 of determining a trust level for the customer. In particular, the act 530 may include, based on identifying the customer, accessing profile information associated with the customer to determine a trust level for the customer. For example, the act 530 can further include analyzing profile information to determine a trust level for the user. Moreover, act 530 can include determining if the trust level is sufficient to grant the user access to the secured product in the secured product display. In other words, the trust level authorizes the user to access secured products belonging to the secured product category.

The method 500 also includes the act 540 of sending a communication to allow the customer to access the secured product. In particular, the act 540 involves, based on the trust level for the customer, sending a communication to the merchant that allows the customer to gain access to the secured product within the secured product display. In some embodiments, providing sending the communication causes the secured product display to unlock and provide access to the customer. Further, the act 550 can include sending access information, e.g., an authorization code, to a mobile client device associated with the user that enables the user to access the contents of the secured product display.

FIG. 6 illustrates a flowchart of a method 600 of determining a customer need. In some embodiments, the customer recognition system described herein performs the method 600. The method 600 includes an act 610 of receiving an image that portrays a customer. In particular, the act 610 may involve receiving an image that portrays a customer located at a physical merchant location. For example, a computing device located in the physical location of the merchant may capture the image. The act 610 can further involve receiving product information from the merchant comprising a location of the user within the merchant location and products corresponding to the location of the user.

The method 600 also includes an act 620 of identifying a facial expression type of the customer. In particular, the act 620 involves analyzing, by at least one processor, the image to identify a facial expression type of the customer portrayed in the image. In some embodiments, the customer recognition system identifies the facial expression type by comparing facial expression features of the customer in the image with groups of images corresponding to defined facial expression types and determining to which group of images the facial expression of the customer most closely corresponds.

In addition, the method 600 includes an act 630 of determining a potential customer need. For example, act 630 involves, based on the facial expression type, determining a potential customer need associated with the customer. For example, each facial expression type is associated with a customer need, and accordingly, upon the customer recognition system identifying a facial expression type, the customer recognition system can determine a potential customer need.

The method 600 also includes an act 640 of providing a notification of the potential customer need. In particular, the act 640 may involve providing, to a client device, a notification of the potential customer need. In one or more embodiments, the client device is associated with the merchant, and providing the notification includes providing an indication to a merchant employee via a merchant client device that the customer is confused. Further, the act 640 may involve determining the merchant employee most suited to respond to the determined customer need. Moreover, the act 640 can include providing user profile information or product information via the merchant client device to assist the merchant employee in resolving the identified customer need.

Figure 7:
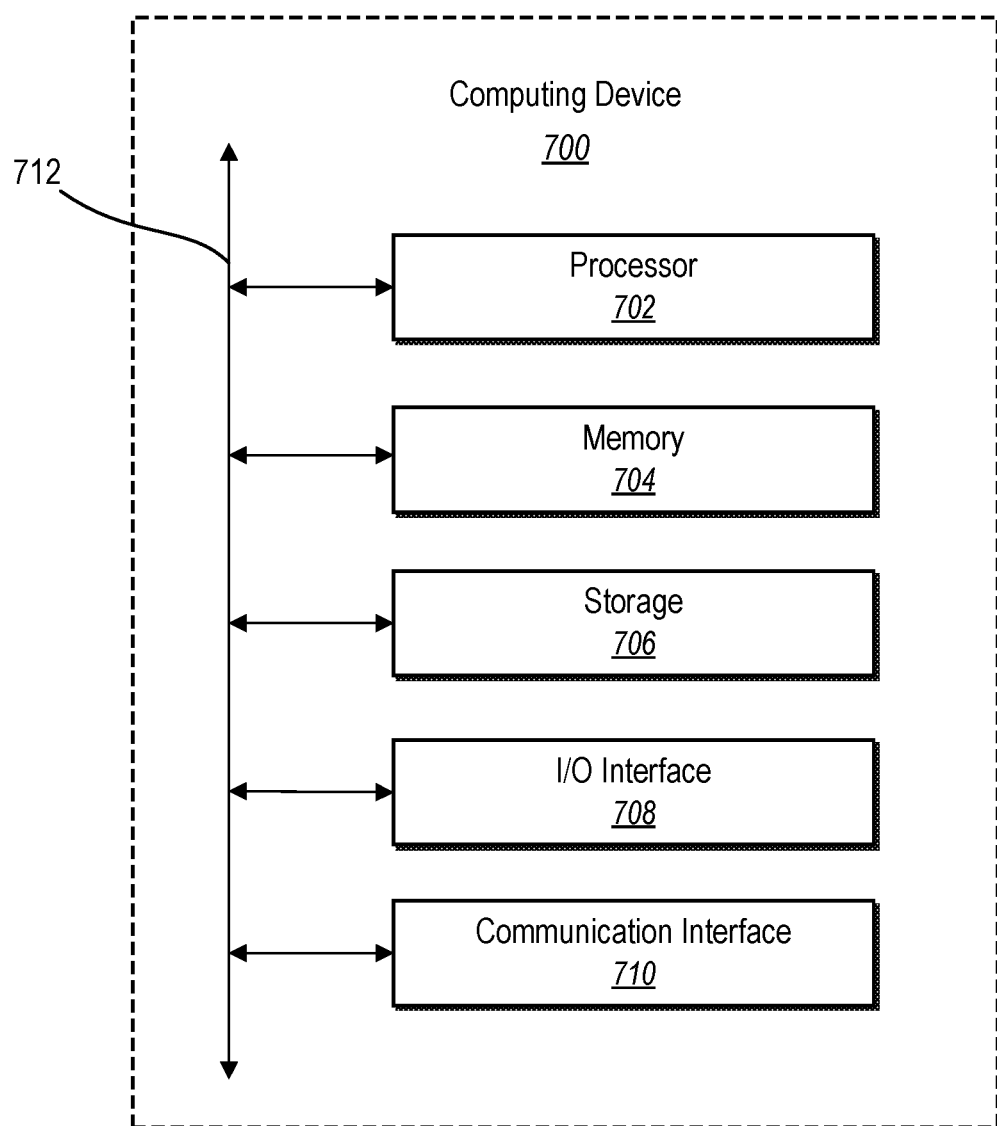
FIG. 7 illustrates a block diagram of a client device in accordance with one or more embodiments described herein.

FIG. 7 illustrates a block diagram of exemplary computing device 700 that may be configured to perform one or more of the processes described above. One will appreciate that the computing device 700 may represent one or more servers or client devices, such as the server device(s) 102, merchant server device(s) 103, customer client device 106, and merchant client device 110. Further, the computing device 700 may represent various types of computing devices. For example, the computing device 700 can include: a mobile device such as a mobile telephone, a smartphone, a PDA, a tablet, a laptop; a non-mobile device such as a desktop or server; or any other type of computing device.

As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7.

In one or more embodiments, the processor 702 includes hardware for executing instructions, such as those making up a computer program. The memory 704 may be used for storing data, metadata, and programs for execution by the processor(s). The storage device 706 includes storage for storing data or instructions.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, the communication interface 710 may include a network interface controller (NIC) or network adapter for communicating with an Ethernet or other wire-based network or a wireless NIC (WNIC) or wireless adapter for communicating with a wireless network, such as a WI-FI. The communication infrastructure 712 may include hardware, software, or both that couples components of the computing device 700 to each other. As an example, the communication infrastructure 712 may include one or more types of buses.

As mentioned above, embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor receives instructions, from a non-transitory computer-readable medium, (e.g., a memory, etc.), and executes those instructions, thereby performing one or more processes, including one or more of the processes described herein.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure.

Those skilled in the art will appreciate that the disclosure may be practiced in network computing environments with many types of computer system configurations. The disclosure may also be practiced in distributed system environments where local and remote computer systems, which are linked through a network, both perform tasks. Embodiments of the present disclosure can also be implemented in cloud computing environments. In this description, "cloud computing" is defined as a model for enabling on-demand network access to a shared pool of configurable computing resources.

As mentioned above, the customer recognition system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication-channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. Herein, the term "friend" may refer to any other user of the social networking system 802 with which a user has formed a connection, association, or relationship via the social networking system 802.

Figure 8:
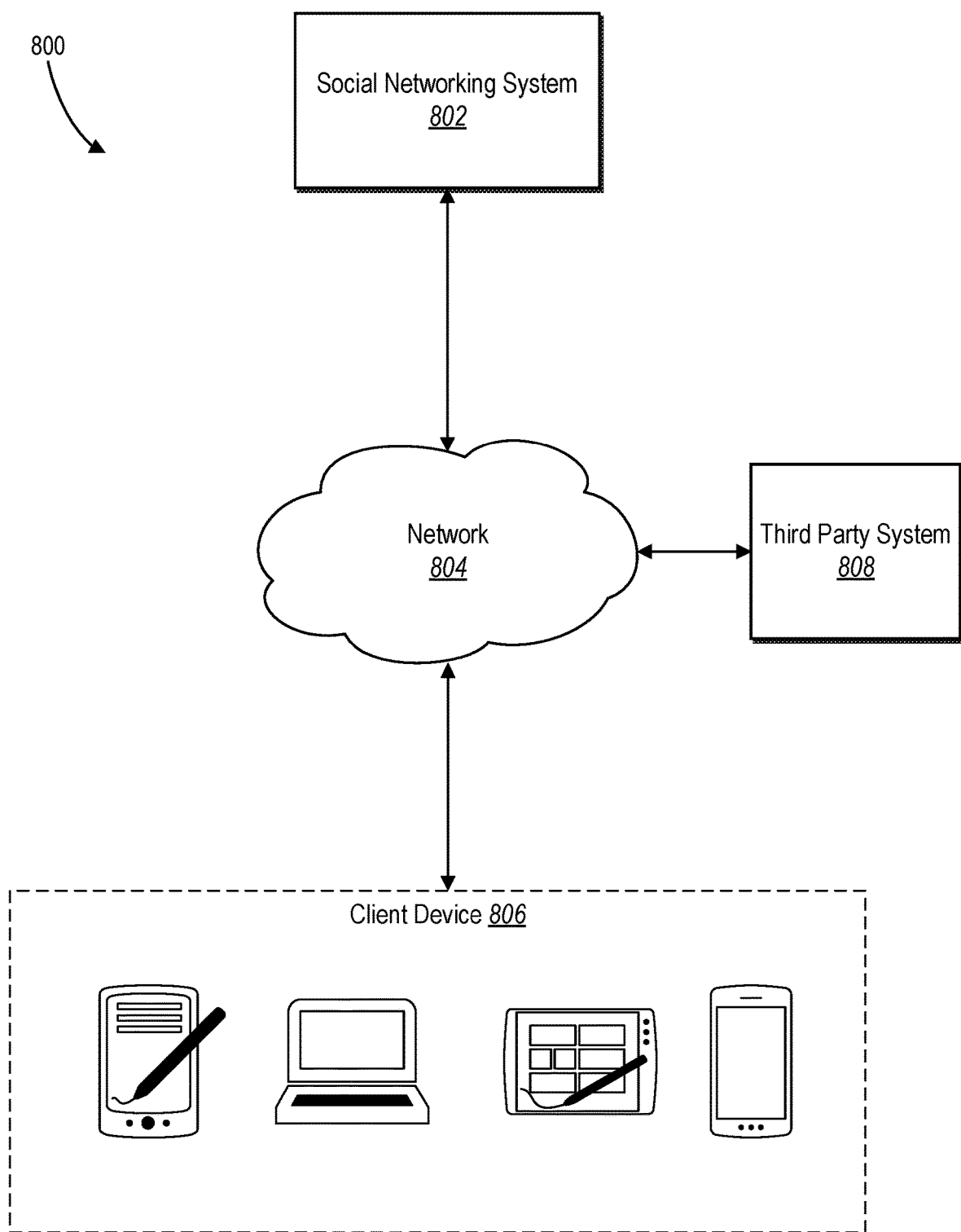
FIG. 8 illustrates a network environment of a social networking system in accordance with one or more embodiments described herein.

FIG. 8 illustrates an example network environment 800 of a social networking system. Network environment 800 includes a client device 806, a social networking system 802, and a third-party system 808 connected to each other by a network 804. Although FIG. 8 illustrates a particular arrangement of client device 806, the social networking system 802, the third-party system 808, and the network 804, this disclosure contemplates any suitable arrangement and number of client device 806, the social networking system 802, the third-party system 808, and the network 804.

Links may connect the client device 806, the social networking system 802, and the third-party system 808 to the network 804 or to each other. Links need not necessarily be the same throughout network environment 800. One or more first links may differ in one or more respects from one or more second links.

In some embodiments, client device 806 may be an electronic device including hardware, software, or embedded logic components or a combination of two or more such components and capable of carrying out the appropriate functionalities implemented or supported by the client device 806. As an example, a client device 806 may include any of the computing devices discussed above in relation to FIG. 7. The client device 806 may enable a network user at the client device 806 to access the network 804. The client device 806 may enable its user to communicate with other users at other client devices or systems.

In some embodiments, the client device 806 may include a web browser, such as and may have one or more add-ons, plug-ins, or other extensions. The client device 806 may render a webpage based on the HTML, files from the server for presentation to the user.

In some embodiments, the social networking system 802 may be a network-addressable computing system that can host an online social network. The social networking system 802 may generate, store, receive, and send social-networking data, such as, for example, user-profile data, concept-profile data, the social-graph information, or other suitable data related to the online social network. The social networking system 802 may be accessed by the other components of the network environment 800 either directly or via the network 804.

In some embodiments, the social networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, etc., or any combination thereof.

In some embodiments, the social networking system 802 may include one or more data stores. Data stores may be used to store various types of information. In some embodiments, the information stored in data stores may be organized according to specific data structures. Particular embodiments may provide interfaces that enable the client device 806, the social networking system 802, or the third-party system 808 to manage, retrieve, modify, add, or delete, the information stored in data store.

In some embodiments, the social networking system 802 may store one or more social graph, described below. In one or more embodiments, the social networking system 802 may provide users with the ability to take actions on various types of items or objects, supported by social networking system 802. As an example, the items and objects may include groups or social networks to which users of the social networking system 802 may belong, events or calendar entries in which a user might be interested, computer-based applications that a user may use, transactions that allow users to buy or sell items via the customer service, interactions with advertisements that a user may perform, etc. A user may also interact with anything that is capable of being represented in the social networking system 802 or by an external system of the third-party system 808, which is separate from the social networking system 802 and coupled to the social networking system 802 via the network 804.

The social networking system 802 can include a variety of store, modules, and/or managers as described below. In one or more embodiments, a connection manager may be used for storing connection information about users. Connection information may indicate users who have similar or common work experience, group memberships, hobbies, educational history, or are in any way related or share common attributes. The connection information may also include user-defined connections between different users and content (both internal and external). An action logging manager may be used to receive communications from a web server about a user's actions on or off the social networking system 802. In conjunction with the action log, a third-party-content-object log may be maintained of user exposures to third-party-content objects. An advertisement-pricing module may combine social information, the current time, location information, or other suitable information to provide relevant advertisements, in the form of notifications, to a user.

Authorization servers may be used to enforce one or more privacy settings of the users of the social networking system 802. A privacy setting of a user determines how particular information associated with a user can be shared. The authorization server may allow users to opt in to or opt out of having their actions logged by the social networking system 802 or shared with other systems (e.g., the third-party system 808), such as, for example, by setting appropriate privacy settings.

In some embodiments, the third-party system 808 may include one or more types of servers, one or more data stores, one or more interfaces, including but not limited to APIs, one or more web services, one or more content sources, one or more networks, or any other suitable components. The third-party system 808 may be operated by a different entity from an entity operating the social networking system 802 even if, in some embodiments, the social networking system 802 and the third-party systems 808 operate in conjunction with each other. In this sense, the social networking system 802 may provide a platform, or backbone, which other systems, such as the third-party systems 808, may use to provide social-networking services and functionality to users across the Internet.

In some embodiments, a third-party system 808 may include a third-party content object provider. A third-party content object provider may include one or more sources of content objects, which may be communicated to the client device 806. As an example, content objects may include information regarding things or activities of interest to the user. As another example, content objects may include incentive content objects.

Figure 9:
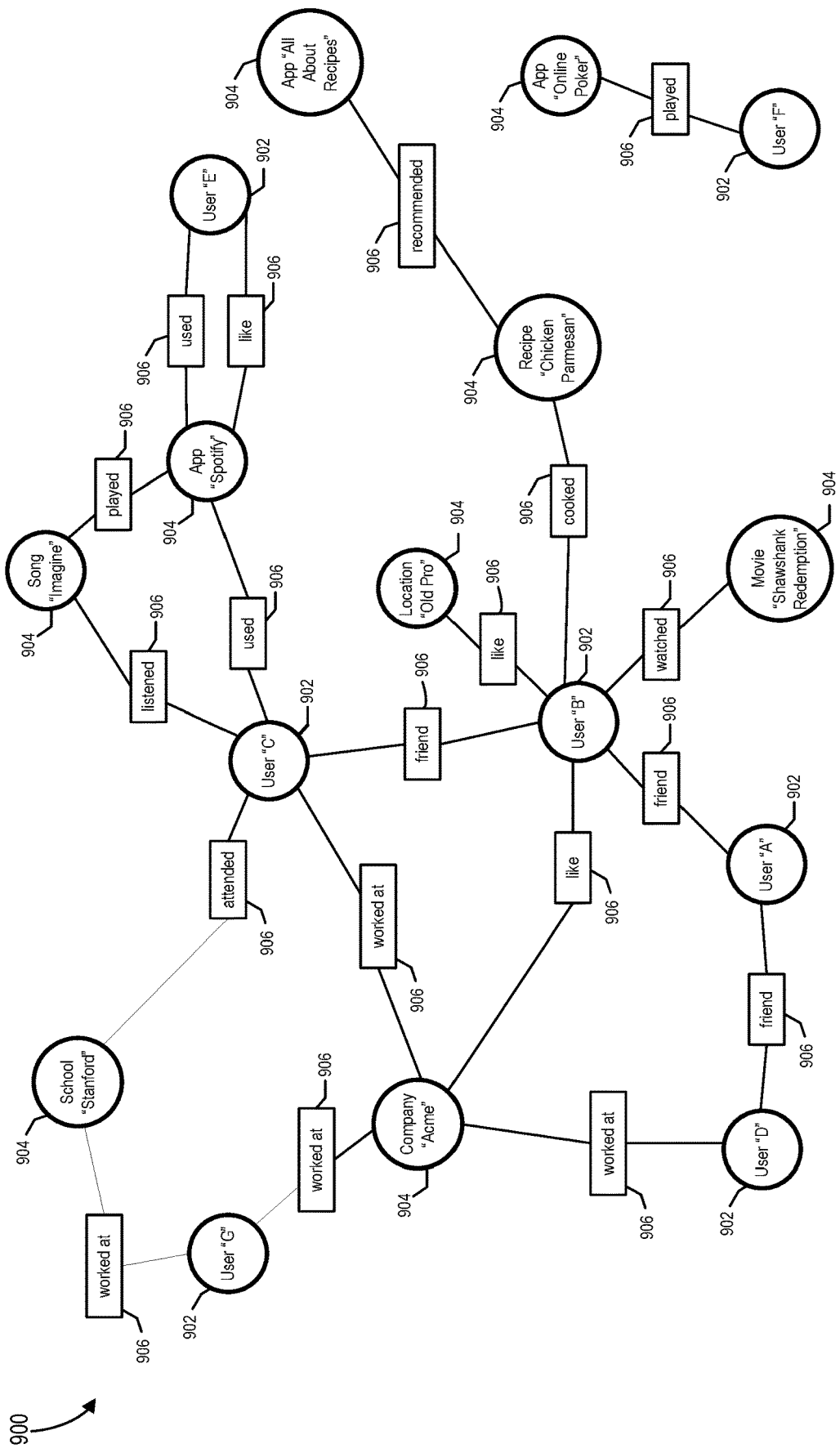
FIG. 9 illustrates an example social graph of a social networking system in accordance with one or more embodiments described herein.

FIG. 9 illustrates an example social graph 900. In some embodiments, the social networking system 802 may store one or more social graphs 900 in one or more data stores. In some embodiments, the social graph 900 may include multiple nodes—which may include multiple user nodes 902 or multiple concept nodes 904—and multiple edges 906 connecting the nodes. The social graph 900 illustrated in FIG. 9 is shown, for didactic purposes, in a two-dimensional visual map representation.

In some embodiments, a user node 902 may correspond to a user of social networking system 802. When a user registers for an account with social networking system 802, the social networking system 802 may create a user node 902 corresponding to the user, and store the user node 902 in one or more data stores. Users and user nodes 902 described herein may, where appropriate, refer to registered users and user nodes 902 associated with registered users.

In some embodiments, a concept node 904 may correspond to a concept. As an example, a concept may correspond to a place, a website, an entity, a resource, etc. A concept may be located within social networking system 802 or on an external server. A concept node 904 may be associated with information of a concept provided by a user or information gathered by various systems, including the social networking system 802.

In some embodiments, a node in social graph 900 may represent or be represented by an online profile page. Profile pages may be hosted by or accessible to social networking system 802. Profile pages may be viewable by all or a selected subset of other users. As an example, a user node 902 may have a corresponding user-profile page in which the corresponding user may add content, make declarations, or otherwise express him or herself. As another example, a concept node 904 may have a corresponding concept-profile page in which one or more users may add content, make declarations, or express themselves, particularly in relation to the concept corresponding to concept node 904.

As an example, an edge 906 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships.

In some embodiments, a pair of nodes in social graph 900 may be connected to each other by one or more edges 906. An edge 906 connecting a pair of nodes may represent a relationship between the pair of nodes. In some embodiments, an edge 906 may include or represent one or more data objects or attributes corresponding to the relationship between a pair of nodes. As an example, a first user may indicate that a second user is a "friend" of the first user. In response to this indication, the social networking system 802 may send a "friend request" to the second user. If the second user confirms the "friend request," social networking system 802 may create an edge 906 connecting the first user's user node 902 to the second user's user node 902 in social graph 900 and store edge 906 as social-graph information in one or more of data stores.

In some embodiments, an edge 906 between a user node 902 and a concept node 904 may represent a particular action or activity performed by a user associated with user node 902 toward a concept associated with a concept node 904. As an example, as illustrated in FIG. 9, a user may "like," "attended," "played," "listened," "cooked," "worked at," or "watched" a concept, each of which may correspond to an edge type or subtype.

In some embodiments, the social networking system 802, the client device 806, or the third-party system 808 may access the social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In some embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on the social networking system 802).

An advertisement may also include social networking system functionality that a user may interact with. As an example, an advertisement may enable a user to "like" or otherwise endorse the advertisement by selecting an icon or link associated with endorsement. In addition or as an alternative, an advertisement may include social networking system context directed to the user. As an example, an advertisement may display information about a friend of the user within social networking system 802 who has taken an action associated with the subject matter of the advertisement.

In some embodiments, the social networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity.

In some embodiments, the social networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions.

Coefficients may be used to predict any number of actions, which may be within or outside of the online social network. As an example, these actions may include various types of communications, such as sending messages, posting content, or commenting on content; various types of observation actions, such as accessing or viewing profile pages, media, or other suitable content; various types of coincidence information about two or more social-graph entities, such as purchasing a product from a merchant.

In some embodiments, the social networking system 802 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user.

To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof.

A coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In some embodiments, the social networking system 802 may determine coefficients using machine-learning algorithms trained on historical actions and past user responses, or data farmed from users by exposing them to various options and measuring responses.

In some embodiments, the social networking system 802 may calculate a coefficient based on a user's actions. The social networking system 802 may monitor such actions on the online social network, on the third-party system 808, on other suitable systems, or any combination thereof. Typical user actions include viewing profile pages, creating or posting content, interacting with content, joining groups, listing and confirming attendance at events, checking-in at locations, liking particular pages, creating pages, and performing other tasks that facilitate social action.

In some embodiments, the social networking system 802 may calculate a coefficient based on the user's actions with particular types of content. The content may be associated with the online social network, the third-party system 808, or another suitable system. The social networking system 802 may analyze a user's actions to determine whether one or more of the actions indicate an affinity for subject matter, content, other users, and so forth.

In some embodiments, the social networking system 802 may calculate a coefficient based on the type of relationship between particular objects. Referencing the social graph 900, the social networking system 802 may analyze the number and/or type of edges 906 connecting particular user nodes 902 and concept nodes 904 when calculating a coefficient. As an example, depending upon the weights assigned to the actions and relationships for the particular user, the overall affinity may be determined to be higher for content about a user's spouse than for content about a user's friend.

In some embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 900.

In some embodiments, the social networking system 802 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 806 of the user). A first user may be more interested in other users or concepts that are closer to the first user. As an example, if a user is one mile from an airport and two miles from a gas station, the social networking system 802 may determine that the user has a higher coefficient for the airport than the gas station based on the proximity of the airport to the user.

In some embodiments, the social networking system 802 may perform particular actions with respect to a user based on coefficient information. Coefficients may be used to predict whether a user will perform a particular action based on the user's interest in the action. A coefficient may be used when generating or presenting any type of objects to a user. The coefficient may also be utilized to rank and order such objects, as appropriate. In this way, the social networking system 802 may provide information that is relevant to user's interests and current circumstances, increasing the likelihood that they will find such information of interest.

In some embodiments, the social networking system 802 may generate search results based on coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network.

In some embodiments, one or more servers may be authorization/privacy servers for enforcing privacy settings. In response to a request from a user (or other entity) for a particular object stored in a data store, the social networking system 802 may send a request to the data store for the object. The request may identify the user associated with the request and may only be sent to the user (or the client device 806 of the user) if the authorization server determines that the user is authorized to access the object based on the privacy settings associated with the object.

The foregoing specification is described with reference to specific exemplary embodiments thereof. The description above and drawings are illustrative and are not to be construed as limiting. The additional or alternative embodiments may be embodied in other specific forms without departing from its spirit or essential characteristics. The scope of the invention is, therefore, indicated by the appended claims rather than by the foregoing description. All changes that come within the meaning and range of equivalency of the claims are to be embraced within their scope.

What is claimed is:

1. A method comprising:
receiving, by at least one processor of a social networking system and from a merchant, an image that portrays a customer and an indication that the customer desires to access a secured product within a secured product display associated with a dispensing terminal at a physical location of the merchant;
analyzing, by the at least one processor of the social networking system, the image to identify the customer portrayed in the image from a plurality of images corresponding to a plurality of users of the social networking system;
accessing, by the at least one processor of the social networking system and based on identifying the customer, profile information associated with the customer;
generating, by the at least one processor of the social networking system, a trust level for the customer based on:
analyzing the profile information associated with the customer to identify one or more attributes;

identifying a plurality of users that share the one or more attributes with the customer, the plurality of users each having a known trust level; and determining the trust level for the customer based on the trust levels of the plurality of users; and sending, by the at least one processor of the social networking system and based on the indication and the trust level for the customer, a communication to the merchant that causes the dispensing terminal to physically provide the secured product to the customer for purchase at a point-of-sale device at the physical location of the merchant.

2. The method of claim 1, wherein determining the trust level for the customer based on the trust levels of the plurality of users comprises:

determining a trust level formula that weights attributes of the user comprising the one or more attributes;

modifying the weight of the one or more attributes in the trust level formula based on the known trust level of the plurality of users that share the one or more attributes with the customer; and determining the trust level for the customer by utilizing the modified trust level formula.

3. The method of claim 1, wherein accessing profile information associated with the customer comprises accessing social networking data of the customer.

4. The method of claim 1, further comprising providing a notification to a client device associated with the customer indicating granted access to the secure product.

5. The method of claim 1, wherein generating the trust level for the customer further comprises modifying the trust level from a previous trust level of untrustworthy to a new trust level of trustworthy.

6. The method of claim 5, further comprising determining, by the at least one processor of the social networking system, the new trust level of trustworthy for the customer further based on the customer previously purchasing the secured product at the physical location of the merchant while having the previous trust level of untrustworthy.

7. The method of claim 1, wherein causing the dispensing terminal to physically provide the secured product to the customer for purchase at the point-of-sale device comprises unlocking a display door of the secured product display that prevented the customer from accessing to the secured products.

8. The method of claim 1, further comprising generating, by the at least one processor of the social networking system, a first access code that the customer provides at the dispensing terminal, and wherein sending the communication to cause the dispensing terminal to physically provide the secured product to the customer for purchase at the point-of-sale device comprises sending the first access code to a client device corresponding to the customer.

9. The method of claim 8, wherein the point-of-sale device is a separate computing device from the dispensing terminal.

10. The method of claim 1, wherein generating, by the at least one processor of the social networking system, the trust level for the customer is further based on the customer previously purchasing the secured product within a threshold time period.

11. A system comprising:

at least one processor; and a non-transitory computer readable medium storing instructions that, when executed by the at least one processor, cause the system to:

receive, at a social networking system, an image from a merchant that portrays a customer and an indication that the customer desires to access a secured product within a secured product display associated with a dispensing terminal at a physical location of the merchant;

analyze, by the social networking system, the image to identify the customer portrayed in the image from a plurality of images corresponding to a plurality of users of the social networking system;

access, by the social networking system and based on identifying the customer, profile information associated with the customer;

generate, by the social networking system, a trust level for the customer based on:

analyzing the profile information associated with the customer to identify one or more attributes;

identifying a plurality of users that share the one or more attributes with the customer, the plurality of users each having a known trust level; and determining the trust level for the customer based on the trust levels of the plurality of users; and send, by the social networking system and based on the indication and the trust level for the customer, a communication to the merchant that causes the dispensing terminal to physically provide the secured product to the customer for purchase at a point-of-sale device at the physical location of the merchant.

12. The system of claim 11, wherein analyzing the image to identify the customer from the plurality of images corresponding to the plurality of users of the social networking system comprises comparing the image that portrays the customer with one or more social networking user profile images of the plurality of users.

13. The system of claim 12, further comprising instructions that, when executed by the at least one processor, cause the system to identify a subset of images corresponding to a subset of users of the social networking system based on the physical location of the merchant.

14. The system of claim 13, wherein the instructions that, when executed by the at least one processor, cause the system to identify the subset of users of the social networking system by determining one or more users of the social networking system from the plurality of user of the social networking system are located within a defined proximity of the physical location of the merchant based on geo-location information.

15. The system of claim 12, wherein comparing the image that portrays the customer with the plurality of images corresponding to the plurality of users of the social networking system comprises using facial recognition techniques to identify a user image that matches the image portraying the customer.

16. A non-transitory computer-readable medium storing instructions that, when executed by at least one processor, cause a computer system to:

receive, at a social networking system, an image from a merchant that portrays a customer and an indication that the customer desires to access a secured product within a secured product display associated with a dispensing terminal at a physical location of the merchant;

analyze, by the social networking system, the image to identify the customer portrayed in the image from a plurality of images corresponding to a plurality of users of the social networking system;

access, by the social networking system and based on identifying the customer, profile information associated with the customer;

generate, by the social networking system, a trust level for the customer based on:
  analyzing the profile information associated with the customer to identify one or more attributes;
  identifying a plurality of users that share the one or more attributes with the customer, the plurality of users each having a known trust level; and
  determining the trust level for the customer based on the trust levels of the plurality of users; and send, by the social networking system and based on the indication and the trust level for the customer, a communication to the merchant that causes the dispensing terminal to physically provide the secured product to the customer for purchase at a point-of-sale device at the physical location of the merchant.

17. The non-transitory computer-readable medium of claim 16, wherein determining the trust level for the customer based on the trust levels of the plurality of users comprises:
  determining a trust level formula that weights attributes of the user comprising the one or more attributes;
  modifying the weight of the one or more attributes in the trust level formula based on the known trust level of the plurality of users that share the one or more attributes with the customer; and
  determining the trust level for the customer by utilizing the modified trust level formula.

18. The non-transitory computer-readable medium of claim 16, wherein causing the dispensing terminal to physically provide the secured product to the customer for purchase at the point-of-sale device comprises unlocking a display door of the secured product display that prevented the customer from accessing to the secured products.

19. The non-transitory computer-readable medium of claim 16, further comprising instructions that cause the computer system to generate a first access code that the customer provides at the dispensing terminal, and wherein sending the communication to cause the dispensing terminal to physically provide the secured product to the customer for purchase at the point-of-sale device comprises sending the first access code to a client device corresponding to the customer.

20. The non-transitory computer-readable medium of claim 19, wherein the point-of-sale device is a separate computing device from the dispensing terminal.

* * * * *